(12) United States Patent
Igaki et al.

(10) Patent No.: US 7,385,179 B2
(45) Date of Patent: Jun. 10, 2008

(54) OPTICAL ENCODER FOR MEASURING DISPLACEMENT

(75) Inventors: Masahiko Igaki, Yokohama (JP); Akio Atsuta, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 11/467,697

(22) Filed: Aug. 28, 2006

(65) Prior Publication Data

US 2007/0102630 A1    May 10, 2007

(30) Foreign Application Priority Data

Aug. 29, 2005    (JP) .............................. 2005-247664

(51) Int. Cl.
*G01D 5/34* (2006.01)

(52) U.S. Cl. ............................ 250/231.14; 250/237 G; 250/550; 356/616; 356/617; 356/450; 356/498

(58) Field of Classification Search ................................ 250/231.13–231.18, 214 PR, 237 R, 237 G; 356/616–617; 341/11, 14; 33/1 PT, 1 N, 33/1 L See application file for complete search history.

(56) References Cited

U.S. PATENT DOCUMENTS

| | | | |
|---|---|---|---|
| 4,782,229 A | 11/1988 | Ernst | |
| 4,979,827 A * | 12/1990 | Matsui | ........................ 356/499 |
| 5,068,530 A | 11/1991 | Ieki et al. | |
| 5,576,537 A | 11/1996 | Holzapfel et al. | |
| 5,604,345 A | 2/1997 | Matsuura | |
| 5,748,373 A * | 5/1998 | Hane et al. | ................... 359/575 |
| 5,752,984 A * | 5/1998 | Knuebel et al. | ................ 8/409 |
| 5,801,378 A * | 9/1998 | Hane et al. | .............. 250/237 G |
| 5,889,280 A | 3/1999 | Matsuura | |
| 5,994,692 A * | 11/1999 | Holzapfel | ................ 250/237 G |
| 6,094,307 A * | 7/2000 | Ieki | ............................ 359/569 |
| 6,552,810 B1 * | 4/2003 | Hermann et al. | ............ 356/614 |
| 7,324,212 B2 * | 1/2008 | Mitchell et al. | ............. 356/499 |
| 2007/0187581 A1 * | 8/2007 | Ohmura et al. | ......... 250/231.13 |

FOREIGN PATENT DOCUMENTS

| | | |
|---|---|---|
| JP | 03-048122 A | 3/1991 |
| JP | 07-146160 A | 6/1995 |
| JP | 08-145724 A | 6/1996 |
| JP | 09-196705 A | 7/1997 |

OTHER PUBLICATIONS

E. Keren and O. Kafri, "Diffraction effects in moire deflectometry", J. Opt. Soc Am. A/vol. 2, No. 2/February, pp. 111-120 (1985).

* cited by examiner

*Primary Examiner*—Davienne Monbleau

(57) ABSTRACT

At least one exemplary embodiment is directed to an optical encoder which includes a first diffraction grating having a desired optical effective aperture ratio at an appropriate gap position so as to eliminate and/or reduce high-harmonic components from the light intensity distribution of interference fringes and reduce high-order spatial frequency components overlapped on a displacement signal of the interference fringes formed by the first diffraction grating.

3 Claims, 25 Drawing Sheets

AR≠50%&AR≠33.33%

+3RD ORDER
+2ND ORDER
+1ST ORDER
0TH ORDER
−1ST ORDER
−2ND ORDER
−3RD ORDER

AR=50%

AR=33.33%

ALL COMPONENTS: FUNDAMENTAL HARMONIC
+ 2ND-, 3RD-, 4TH-, 5TH-, 6TH-ORDER COMPONENTS

FUNDAMENTAL HARMONIC +3RD-ORDER COMPONENT

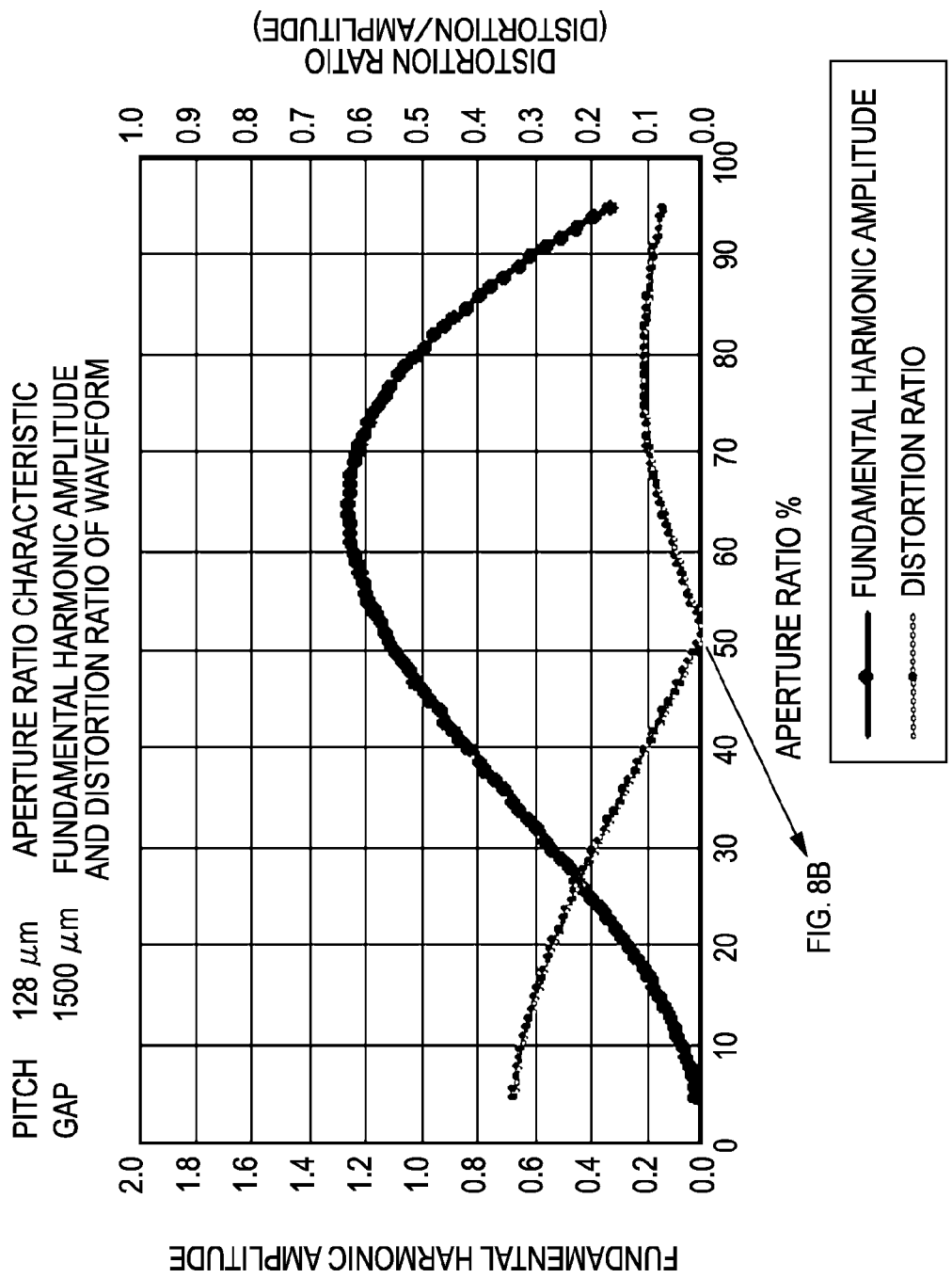

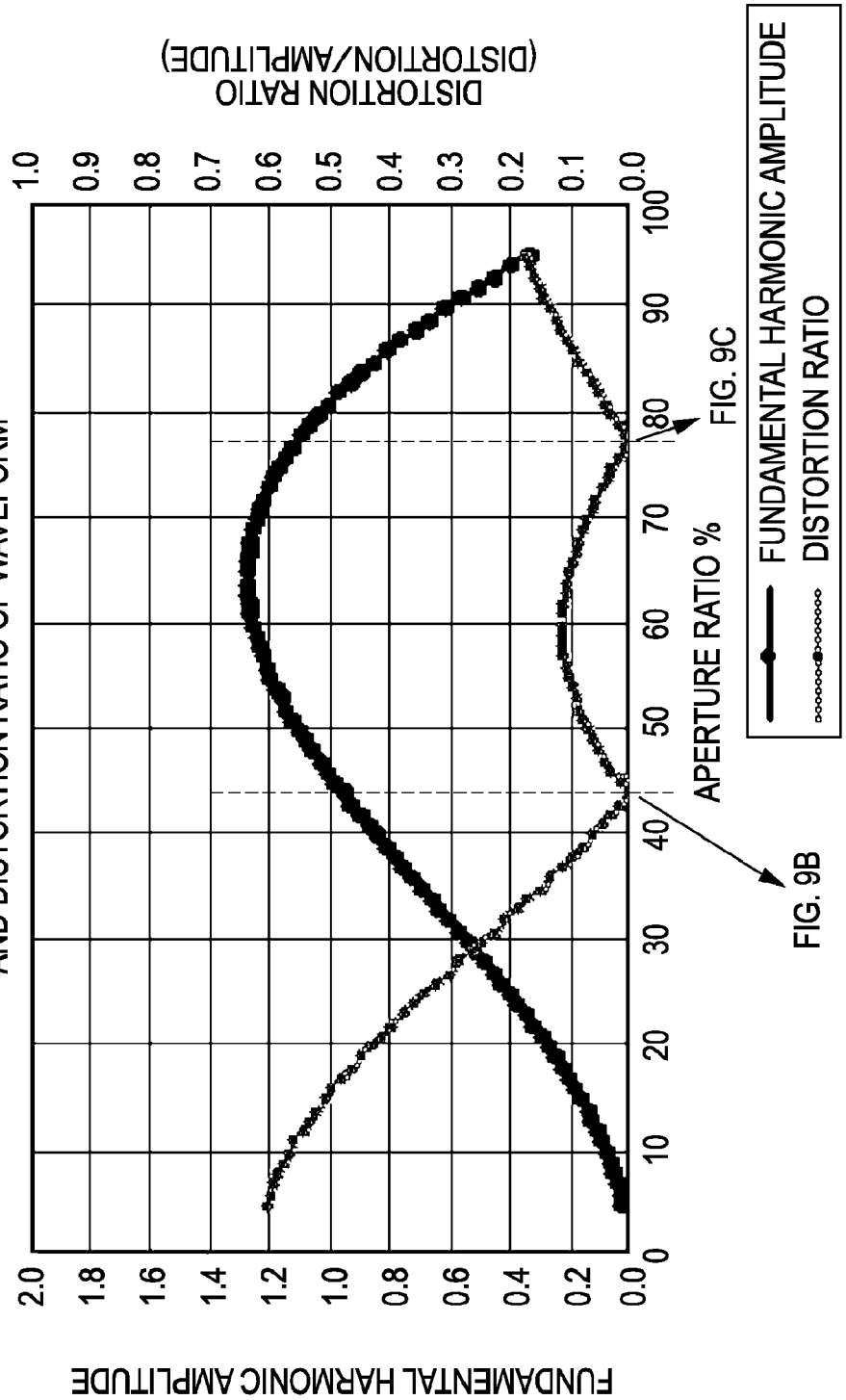

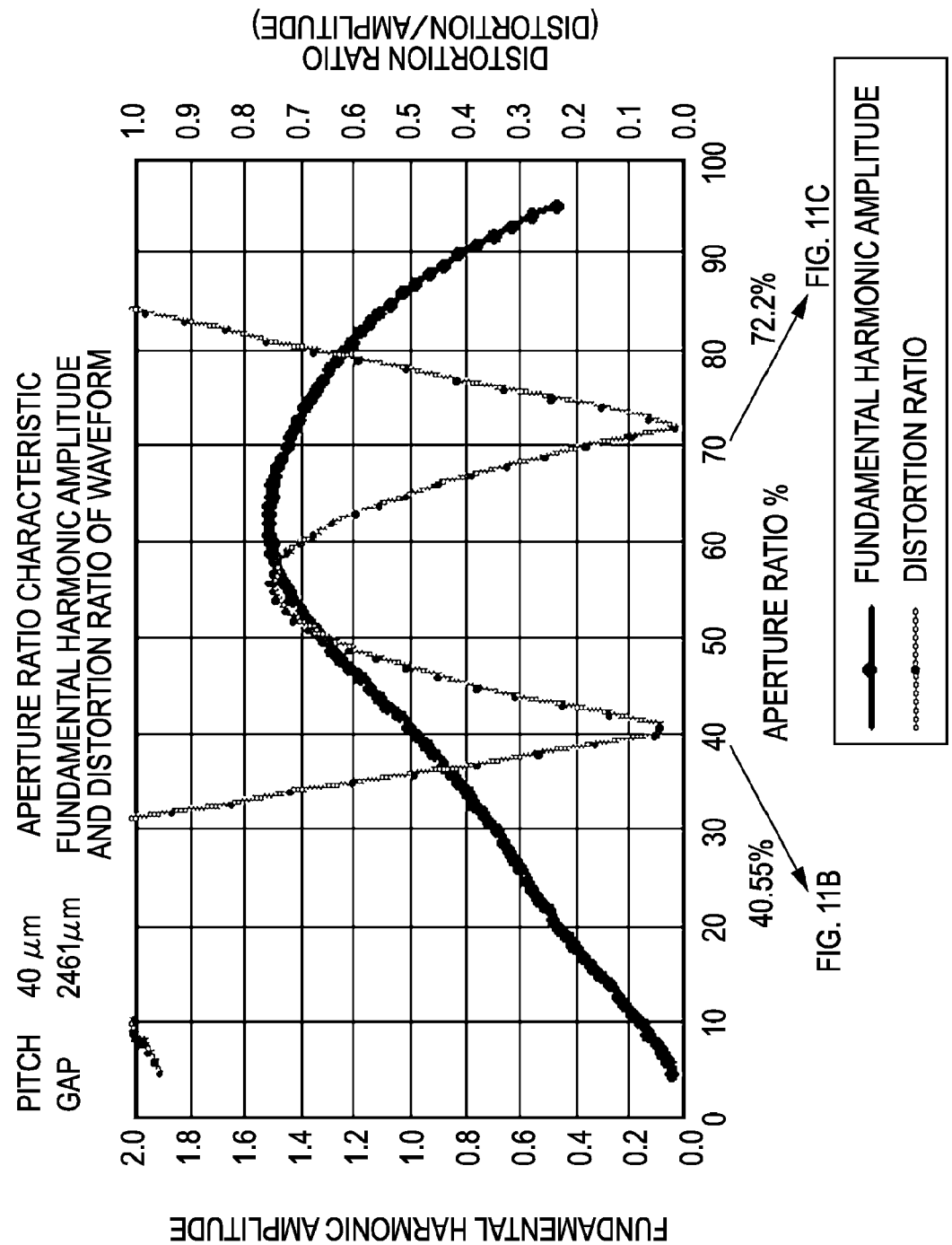

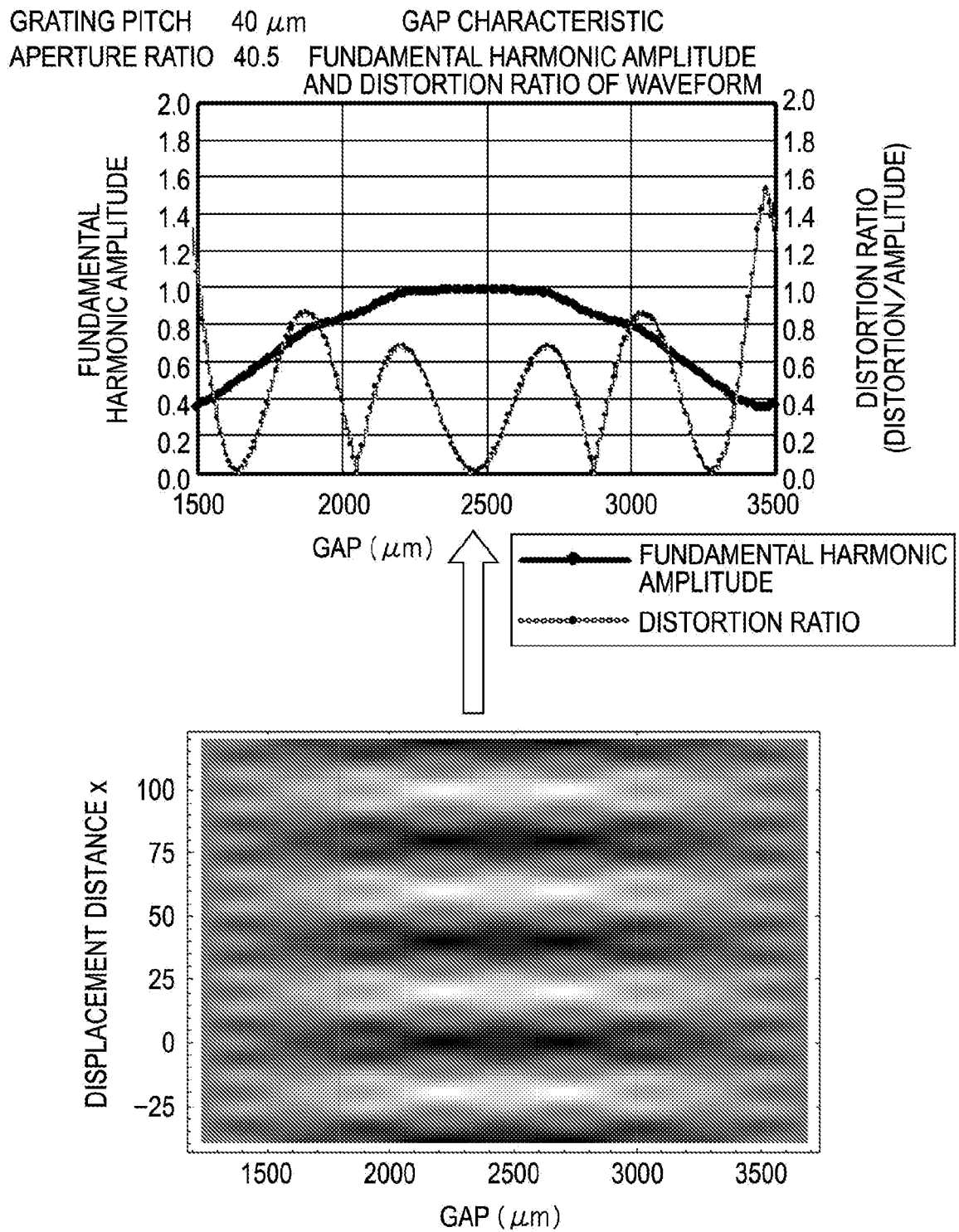

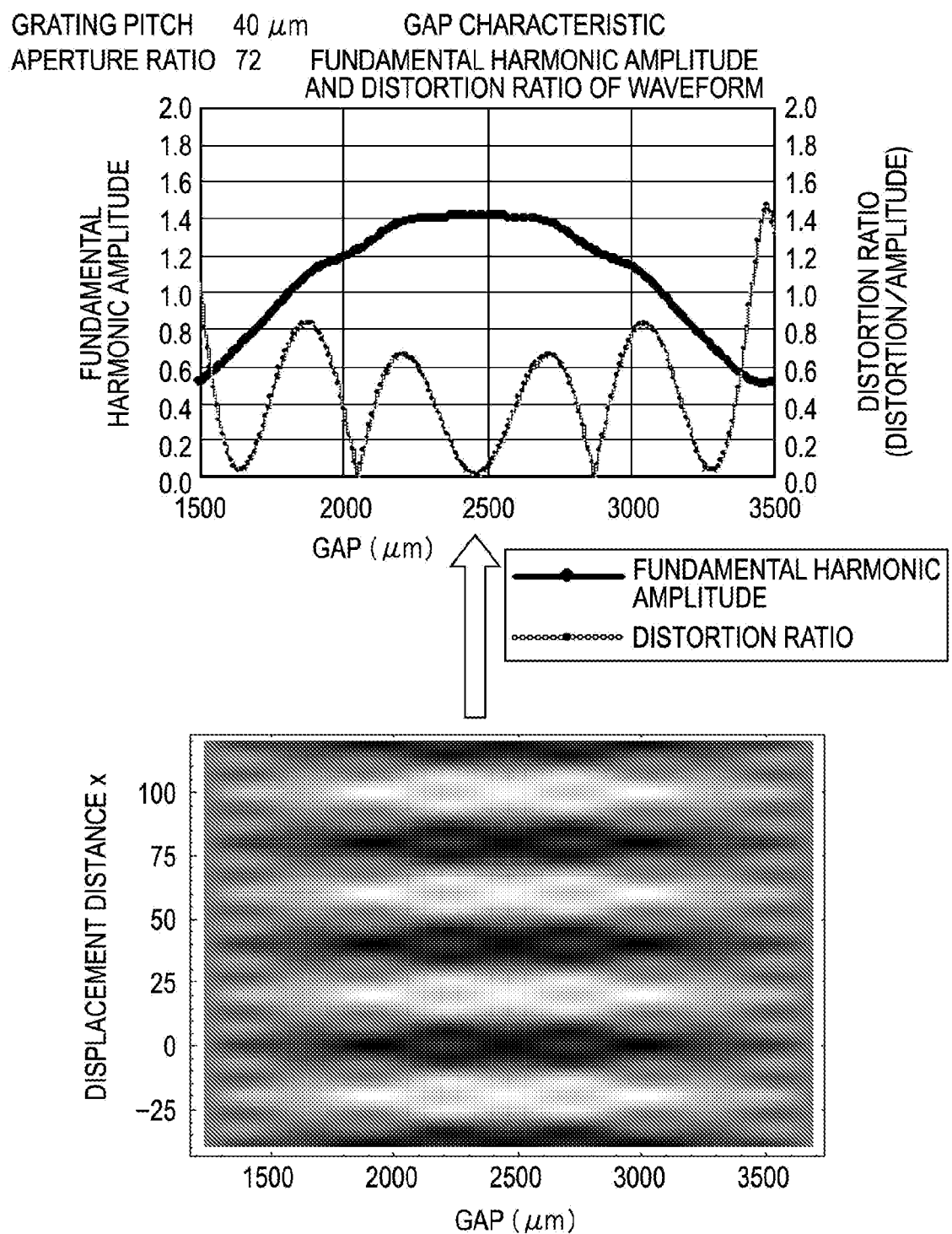

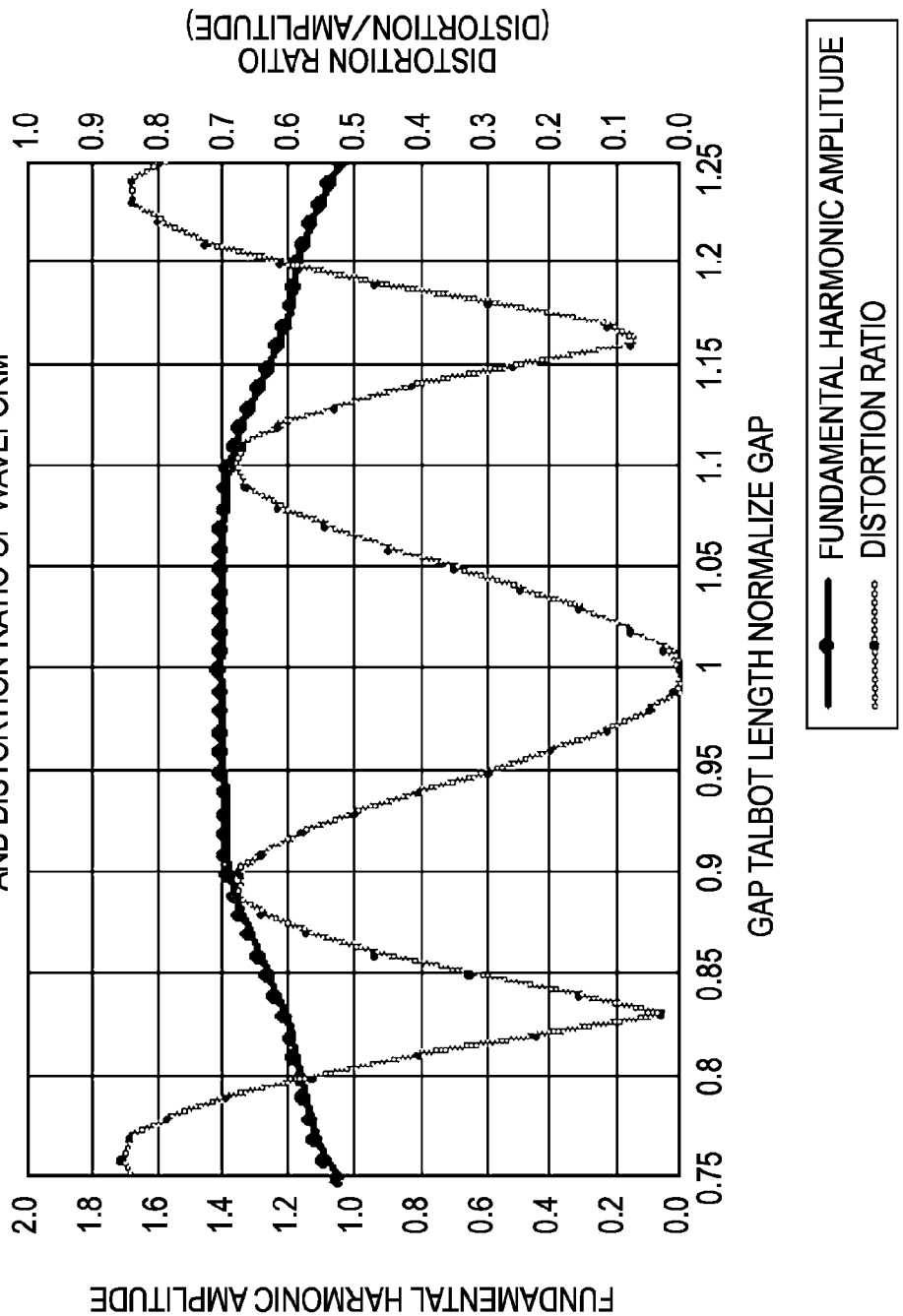

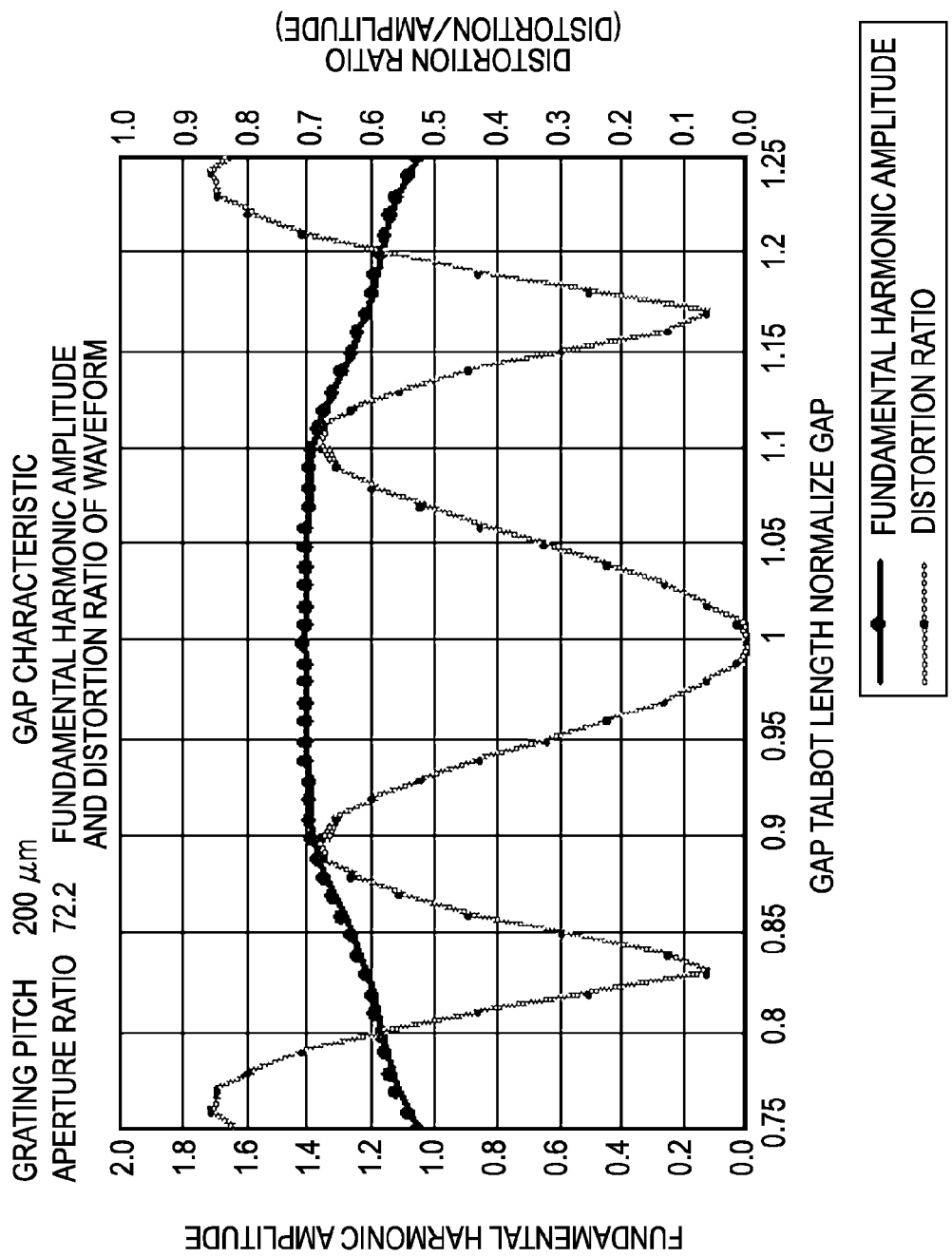

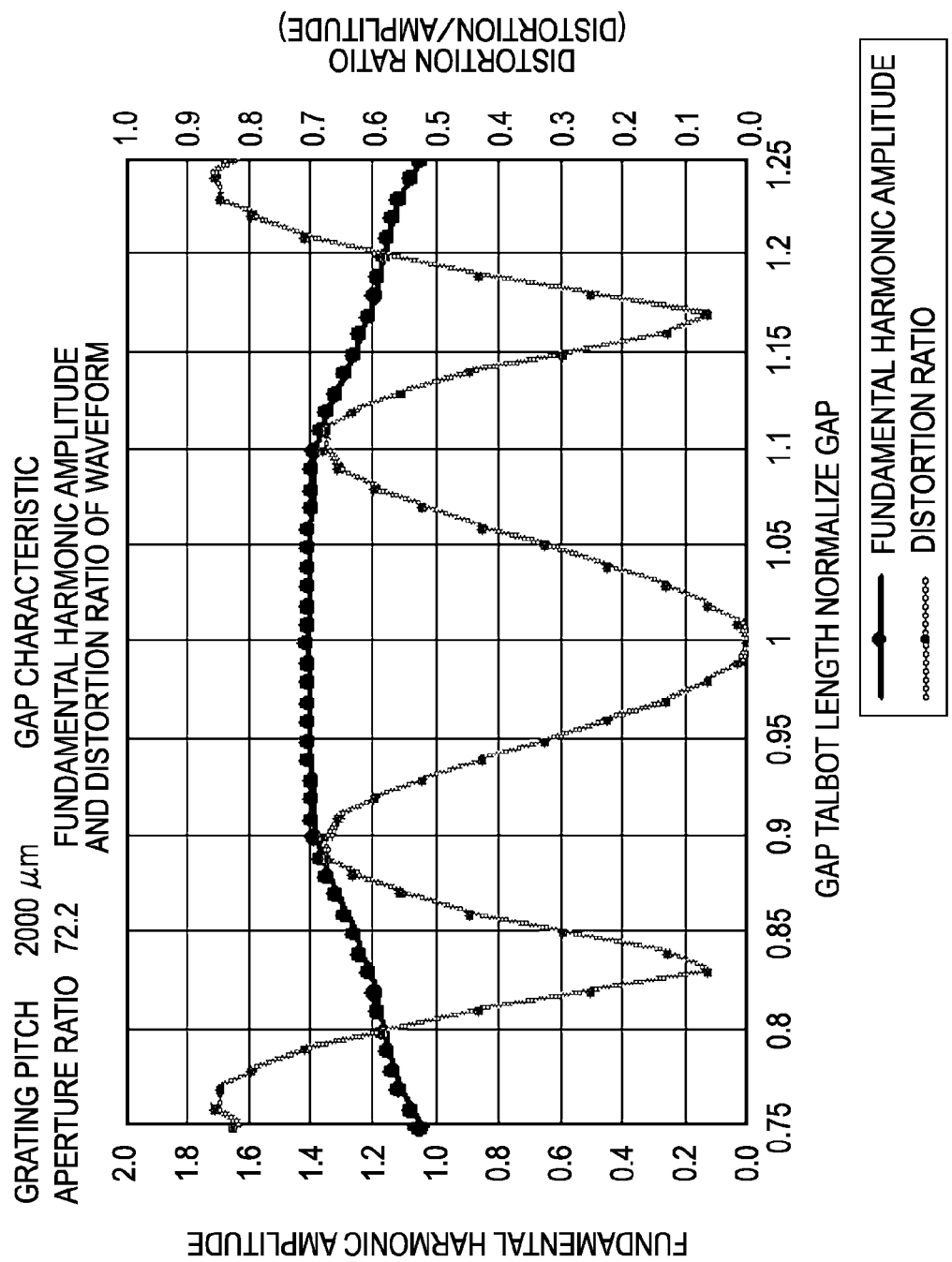

OPTICAL ENCODER FOR MEASURING DISPLACEMENT

BACKGROUND OF THE INVENTION

1. Field of the Invention

The present invention relates to an optical encoder configured to measure the displacement of a diffraction grating, more particularly though not exclusively, measuring the displacement by emitting a light beam from a light source onto the diffraction grating and counting light-dark fringes in the interference pattern formed.

2. Description of the Related Art

Known optical encoders include a main scale formed from a square wave amplitude grating in which light transmissive portions and light shielding portions (or light reflective portions and light non-reflective portions) having the same width are arranged at a predetermined pitch.

A transmissive optical encoder emits parallel light beams to the scale. The light beams passing through the scale and having a square wave pattern further pass through an index scale in which light transmissive portions and light shielding portions are arranged at a predetermined pitch. The transmitted light beams are received by a light-receiving element.

By receiving a light-dark pattern of the light passing through the index scale and being modulated by the relative movement of the main scale and the index scale, the light-receiving element generates a displacement signal that periodically varies in accordance with the relative movement. By processing the displacement signal, the displacement can be measured.

In the index scale, the light transmissive portions and light shielding portions (or the light reflective portions and light non-reflective portions) having the same width are alternately arranged at the predetermined pitch.

In most transmissive optical encoders, in order to obtain two sine wave signals that are out of phase by 90° (known as A-phase and B-phase sine wave signals), two square wave amplitude grating areas are provided.

In such measuring apparatuses, a fine measurement resolution is required. Accordingly, the number of interpolations is increased using an electrical dividing device. To obtain a finely divided signal, it is useful that an ideal sine wave signal is provided to the electrical dividing device used to divide the displacement signal.

However, geometrically, the displacement signal obtained from the above-described optical encoder is a triangular wave or a trapezoidal wave corresponding to changes in the overlap of the scale gratings.

In particular, if the pitch is relatively coarse or a sufficiently coherent light source is used, the displacement signal tends to be a triangular wave or a trapezoidal signal. The displacement signal composed of such a pseudo sine wave signal has a large waveform distortion.

Additionally, the distortion ratio markedly varies in accordance with variations in the distance between the main scale and the index scale. When a position is measured using such a displacement signal having such a variation in distortion-ratio, a large interpolation error occurs, which results in a measurement error of the position.

Accordingly, several techniques for reducing harmonic distortion of the optical encoder have been proposed.

For example, in order to reduce the harmonic components in the light intensity distribution of multiple wave interference fringes, which are formed in an area in an space behind the main scale where diffraction light beams overlap, a square wave amplitude grating is improved using the following techniques:

(1) The width of the light transmissive portion of the main scale of the square wave amplitude grating is non-uniformly differentiated from that of the light shielding portion while maintaining the pitch so that the square wave amplitude grating virtually functions as a sine wave grating (refer to, for example, Japanese Patent No. 2695623).

(2) The ratio of the width of the light transmissive portion to that of the light shielding portion is changed from 1:1 to 2:1 (refer to, for example, Japanese Patent Laid-Open No. 09-196705).

However, in the technique (1), the illumination distribution on the scale should be uniform.

The optical encoder has a structure in which gratings having non-uniform aperture ratios are appropriately distributed on a surface of the main scale. In this structure, the optical encoder has an adverse effect from the non-uniform illumination distribution.

In the technique (2), the harmonic distortion can be reduced simply by changing the aperture width of the square wave amplitude grating on the main scale.

In addition, since the aperture widths are uniformly changed in the entire effective area of the gratings on the main scale, the distortion can be reduced even when non-uniform illumination is present.

Furthermore, from a viewpoint of the ease of manufacturing, it is easy to set a desired aperture ratio while maintaining the high precision of the pitch on the main scale.

However, in technique (2), the ratio of the width of the light transmissive portion to the light shielding portion is changed from 1:1 to 2:1. Therefore, the above-described feature disappears at a particular gap position. Therefore, the reduction in the distortion at any gap is difficult.

Accordingly, to remove or reduce the distortion more effectively, the harmonic distortion should be reduced from the light intensity distribution of the multiple wave interference fringes projected on the index scale.

That is, the distortion of a diffraction image on the main scale should be removed.

The problems of the technique (2) are described in detail with reference to a description and drawings of Japanese Patent Laid-Open No. 09-196705 and FIGS. 17A and 17B.

FIG. 17A is a diagram illustrating the structure of the main portion of the known optical encoder.

As shown in FIG. 17A, a main scale 1 is a transmissive main scale on which light transmissive portions 11 and shielding portions 12 are arranged at a pitch of P. The width of the light transmissive portion 11 is 2P/3.

On an index scale 3, light transmissive portions and shielding portions are arranged at a pitch of P. The width of the light transmissive portion is the same as that of the shielding portion.

In such a structure, the operation and features of technique (2) are described as follows.

It is noted that, in the following description of the cited reference, "FIG. 4" in the cited reference is replaced with "FIG. 17B."

". . . In this exemplary embodiment, as described above, the width of the light transmissive portion 11 of the main scale 1 is set to 2P/3. Thus, the third harmonic wave of a displacement output signal, which is a pseudo sine wave, is removed. The principal is described next with reference to FIG. 17B. Let P denote the pitch of the main scale 1 and L denote the width of the light transmissive portion 11. When parallel beams are incident on the main scale 1 and only straight light components are discussed, the transmissive light pattern of the main scale 1 appears to be a square wave pattern, as shown in FIG. 17B. At that time, a transmissive light intensity pattern I(x) in the displacement direction x can be expressed using Fourier expansion as follows:

$$I(x) = C \cdot \sum_{n=1}^{\infty} \frac{1 - \cos(2n\pi L / P)}{n} \sin(2n\pi x / P) + \\ C \cdot \sum_{n=1}^{\infty} \frac{\sin(2n\pi L / P)}{n} \cos(2n\pi x / P) + D \qquad (1)$$

In equation (1), C and D denote constant values. This transmissive light pattern is further modulated by the index scale 3 on the light receiving side. Thus, a pseudo sine-wave output can be obtained. As can be seen from equation (1), when the third harmonic wave, which is the highest odd harmonic component, is discussed (i.e., n=3), both coefficients of the first and second terms become zero when L=P/3 or L=2P/3. Therefore, since L=2P/3 in this exemplary embodiment, the third harmonic component is removed from the displacement signal. Consequently, a displacement signal that is close to a sine wave can be obtained. . . . " (the end of cited sentences).

The above-described cited reference has several drawbacks. The first drawback is that the intensity pattern I(x) expressed as equation (1) represents the intensity transmission ratio distribution of the grating. There is no problem if the light intensity pattern immediately after the main scale is considered to be such a square pattern. However, as shown in FIG. 17A, in the actual structure of the encoder, a predetermined gap (z) is provided between the main scale and the index scale.

In this actual structure, equation (1) does not represent the light intensity distribution of the interference fringes overlapped on the index scale. That is, the light intensity distribution should be represented by at least a function I(x, z).

The light intensity distribution I(x) expressed as equation (1) is approximately true only at the following particular gap position $Z_n$:

$$Z_n = nP^2 / \lambda (n = 1, 2, 3, \dots) \qquad (2)$$

where λ is the wavelength of a light source and P is a scale pitch.

This intensity distribution appearing at the particular gap position $Z_n$ and being proportional to the intensity transmission ratio distribution of the grating is referred to as a "Fourier image."

As a second drawback, according to technique (2), it is assumed that, at the gap position $Z_n$ where equation (1) is approximately true and the Fourier image is generated, the optical effective aperture ratio (i.e., the ratio of the width of the transmissive portion to that of the shielding portion) of the main scale is set to 2:1 instead of 1:1.

In square wave amplitude gratings, some combinations of the 0th-, ±1st-, ±2nd-, and ±3rd-order diffracted light components in the generated diffracted light, that is, (0, +3), (0, −3), (+1, −2), and (−1, +2) contribute to the generation of the third harmonic component contained in the displacement waveform.

In the technique (2), when the aperture ratio is 2:1 (1:2 is also allowed), the third-order diffracted light is missing (a missing order).

Accordingly, the combinations (0, +3) and (0, −3) are eliminated. However, the components for the combinations (+1, −2) and (−1, +2) still remain. Except for the case where the components for the combinations (+1, −2) and (−1, +2) are canceled due to a 180° out-of-phase relationship, the third-order component distortion is not eliminated.

As described above, in the technique (2), I(x) is only a Fourier expansion of a transmissive light pattern on the surface of the main scale, and therefore, this equation does not represent the light intensity distribution in the diffraction space behind the main scale.

Consequently, to eliminate the high-order harmonic components by changing the optical effective aperture ratio of the main scale, the following light intensity distribution formed behind the diffraction grating on the main scale should be found using an optical effective aperture ratio of the diffraction grating AR and the gap size z:

$$I(x, y, z, AR, \lambda) \qquad (3)$$

That is, the light intensity distribution based on a so-called "diffraction theory" should be computed.

SUMMARY OF THE INVENTION

At least one exemplary embodiment is directed to an optical encoder configured to measure the displacement of a diffraction grating formed on a main scale by emitting a light beam from a light source onto the diffraction grating and counting light-dark fringes in the interference pattern formed in an area where a plurality of diffracted light beams overlap. At least one exemplary embodiment of the optical encoder includes a rotary encoder and a linear encoder.

Accordingly, at least one exemplary embodiment of the present invention is directed to the following:

(a) A relational expression I(x, y, z, AR, λ) relating to an interference image generated by a diffraction grating generated by a simple method;

(b) A high-order harmonic distortion D contained in the x-direction light intensity distribution I(x) of an interference image on the index scale, which is disposed so as to have the aperture ratio AR of the square wave amplitude grating and the gap z, is quantitatively defined and the relationship among these parameters is also defined; and (c) On the basis of the definitions according to (b), a measurement precision of an optical encoder is increased by reducing the high-order harmonic distortion component of a displacement signal by controlling the aperture ratio AR of the square wave amplitude grating at an appropriate gap position z.

According to an exemplary embodiment of the present invention, an optical encoder includes a light source, a scale including a first diffraction grating, where the scale moves relative to the light source and the first diffraction grating diffracts a light beam emitted from the light source, a light receiving unit including a plurality of light-receiving elements, where the light receiving unit receives interference fringes formed by the overlap of diffracted light beams diffracted by the first diffraction grating and generates an output signal, a second diffraction grating disposed between the first diffraction grating and the light receiving unit, and a computing unit for computing an amount of a movement of the scale relative to the light source on the basis of the output signal. When λ denotes the wavelength of the light source, P denotes the pitch of the first diffraction grating, x denotes a direction of the grating arrangement, AR (=d/P) denotes the optical effective aperture ratio of the first diffraction grating, d denotes the optical effective aperture width of the first diffraction grating, GAP (=z) denotes an effective optical gap between the first diffraction grating and the second diffraction grating, and PO denotes a period of a fundamental harmonic of interference fringes overlapped on the second diffraction grating, AR and GAP are determined so that the following evaluation equation D including a relational expression $I(x, z, d, P, \lambda)$ has a minimal value:

$$D = \int_0^p \{I(x, z, d, p, \lambda) - I(x - po/2, z, d, p, \lambda)\}\, dx$$

where $$I(x, z, d, P, \lambda) = \frac{2d \cos\left[\frac{\frac{2\pi x}{p} + \frac{2\pi z}{\lambda} - 2\pi z\sqrt{1 - \frac{\lambda^2}{p^2}}}{\lambda}\right] \sin\left[\frac{d\pi}{p}\right]}{p\pi} +$$

$$\frac{2d \cos\left[\frac{\frac{2\pi x}{p} - \frac{2\pi z}{\lambda} + 2\pi z\sqrt{1 - \frac{\lambda^2}{p^2}}}{\lambda}\right] \sin\left[\frac{d\pi}{p}\right]}{p\pi} +$$

$$\frac{\cos\left[\frac{\frac{6\pi x}{p} + 2\pi z\sqrt{1 - \frac{4\lambda^2}{p^2}} - 2\pi z\sqrt{1 - \frac{\lambda^2}{p^2}}}{\lambda}\right] \sin\left[\frac{d\pi}{p}\right]\sin\left[\frac{2d\pi}{p}\right]}{\pi^2} +$$

$$\frac{\cos\left[\frac{\frac{6\pi x}{p} - 2\pi z\sqrt{1 - \frac{4\lambda^2}{p^2}} + 2\pi z\sqrt{1 - \frac{\lambda^2}{p^2}}}{\lambda}\right] \sin\left[\frac{d\pi}{p}\right]\sin\left[\frac{2d\pi}{p}\right]}{\pi^2} +$$

$$\frac{2d \cos\left[\frac{\frac{6\pi x}{p} + \frac{2\pi z}{\lambda} - 2\pi z\sqrt{1 - \frac{9\lambda^2}{p^2}}}{\lambda}\right] \sin\left[\frac{3d\pi}{p}\right]}{3p\pi} +$$

$$\frac{2d \cos\left[\frac{\frac{6\pi x}{p} - \frac{2\pi z}{\lambda} + 2\pi z\sqrt{1 - \frac{9\lambda^2}{p^2}}}{\lambda}\right] \sin\left[\frac{3d\pi}{p}\right]}{3p\pi}$$

when the first diffraction grating is illuminated with a parallel light beam, and $$I(x, z, d, P, \lambda) =$$

$$\frac{2d \cos\left[\frac{\frac{2\pi\sqrt{x^2 + 4z^2}}{\lambda} - 2\pi\sqrt{\left(x - \frac{z\lambda}{p}\right)^2 + z^2\left(1 + \sqrt{1 - \frac{\lambda^2}{p^2}}\right)^2}}{\lambda}\right]\sin\left[\frac{d\pi}{p}\right]}{p\pi} +$$

$$\frac{2d \cos\left[\frac{\frac{2\pi\sqrt{x^2 + 4z^2}}{\lambda} - 2\pi\sqrt{\left(x - \frac{z\lambda}{p}\right)^2 + z^2\left(1 + \sqrt{1 - \frac{\lambda^2}{p^2}}\right)^2}}{\lambda}\right]\sin\left[\frac{d\pi}{p}\right]}{p\pi} +$$

$$\frac{1}{\pi^2}\left(\cos\left[\frac{2\pi\sqrt{\left(x + \frac{2z\lambda}{p}\right)^2 + z^2\left(1 + \sqrt{1 - \frac{4\lambda^2}{p^2}}\right)^2}}{\lambda} - \frac{2\pi\sqrt{\left(x - \frac{z\lambda}{p}\right)^2 + z^2\left(1 + \sqrt{1 - \frac{\lambda^2}{p^2}}\right)^2}}{\lambda}\right]\sin\left[\frac{d\pi}{p}\right]\sin\left[\frac{2d\pi}{p}\right]\right) +$$

$$\frac{1}{\pi^2}\left(\cos\left[\frac{2\pi\sqrt{\left(x - \frac{2z\lambda}{p}\right)^2 + z^2\left(1 + \sqrt{1 - \frac{4\lambda^2}{p^2}}\right)^2}}{\lambda} - \frac{2\pi\sqrt{\left(x + \frac{z\lambda}{p}\right)^2 + z^2\left(1 + \sqrt{1 - \frac{\lambda^2}{p^2}}\right)^2}}{\lambda}\right]\sin\left[\frac{d\pi}{p}\right]\sin\left[\frac{2d\pi}{p}\right]\right) + \frac{1}{3p\pi}\left(2d\cos\left[\frac{2\pi\sqrt{x^2 + 4z^2}}{\lambda} - \frac{2\pi\sqrt{\left(x - \frac{3z\lambda}{p}\right)^2 + z^2\left(1 + \sqrt{1 - \frac{9\lambda^2}{p^2}}\right)^2}}{\lambda}\right]\sin\left[\frac{3d\pi}{p}\right]\right) + \frac{1}{3p\pi}$$

-continued $$\left\{2d\cos\left[\frac{2\pi\sqrt{x^2+4z^2}}{\lambda}-\frac{2\pi\sqrt{\left(x+\frac{3z\lambda}{p}\right)^2+z^2\left(1+\sqrt{1-\frac{9\lambda^2}{p^2}}\right)^2}}{\lambda}\right]\sin\left[\frac{3d\pi}{p}\right]\right\}$$

when the first diffraction grating is illuminated with a divergent light beam.

According to another exemplary embodiment of the present invention, an optical encoder includes a light source, a scale including a first diffraction grating, where the scale moves relative to the light source and the first diffraction grating diffracts a light beam emitted from the light source, a light receiving unit including a plurality of light-receiving elements, where the light receiving unit receives interference fringes formed by the overlap of diffracted light beams diffracted by the first diffraction grating and generates an output signal, and a computing unit for computing an amount of a movement of the scale relative to the light source on the basis of the output signal. When AR represents the optical effective aperture ratio of the first diffraction grating, AR is a value in the range of (40 −5)% and (40+5)% or a value in the range of (72−5)% and (72+5)%.

According to still another exemplary embodiment of the present invention, an optical encoder includes a light source, a scale including a first diffraction grating, where the scale moves relative to the light source and the first diffraction grating diffracts a light beam emitted from the light source, a light receiving unit including a plurality of light-receiving elements, where the light receiving unit receives interference fringes formed by the overlap of diffracted light beams diffracted by the first diffraction grating and generates an output signal, and a computing unit for computing an amount of a movement of the scale relative to the light source on the basis of the output signal. When AR denotes the optical effective aperture ratio of the first diffraction grating, GAP (=z) denotes an effective optical gap between the first diffraction grating and the light receiving unit, and GAP=z<2 mm, AR is a value in the range of (44−5)% and (44+5)% or a value in the range of (78−5)% and (78+5)%.

Further features of the present invention will become apparent through the following description of exemplary embodiments with reference to the attached drawings.

BRIEF DESCRIPTION OF THE DRAWINGS

FIGS. 8A and 8B are graphs illustrating an application 1 of the first exemplary embodiment.

FIGS. 9A-C are graphs illustrating an application 2 of the first exemplary embodiment.

FIGS. 11A-C are graphs illustrating the application 3 of the first exemplary embodiment.

FIGS. 12A-C illustrate a specific application of the first exemplary embodiment.

DESCRIPTION OF THE EMBODIMENTS

Figure 1:
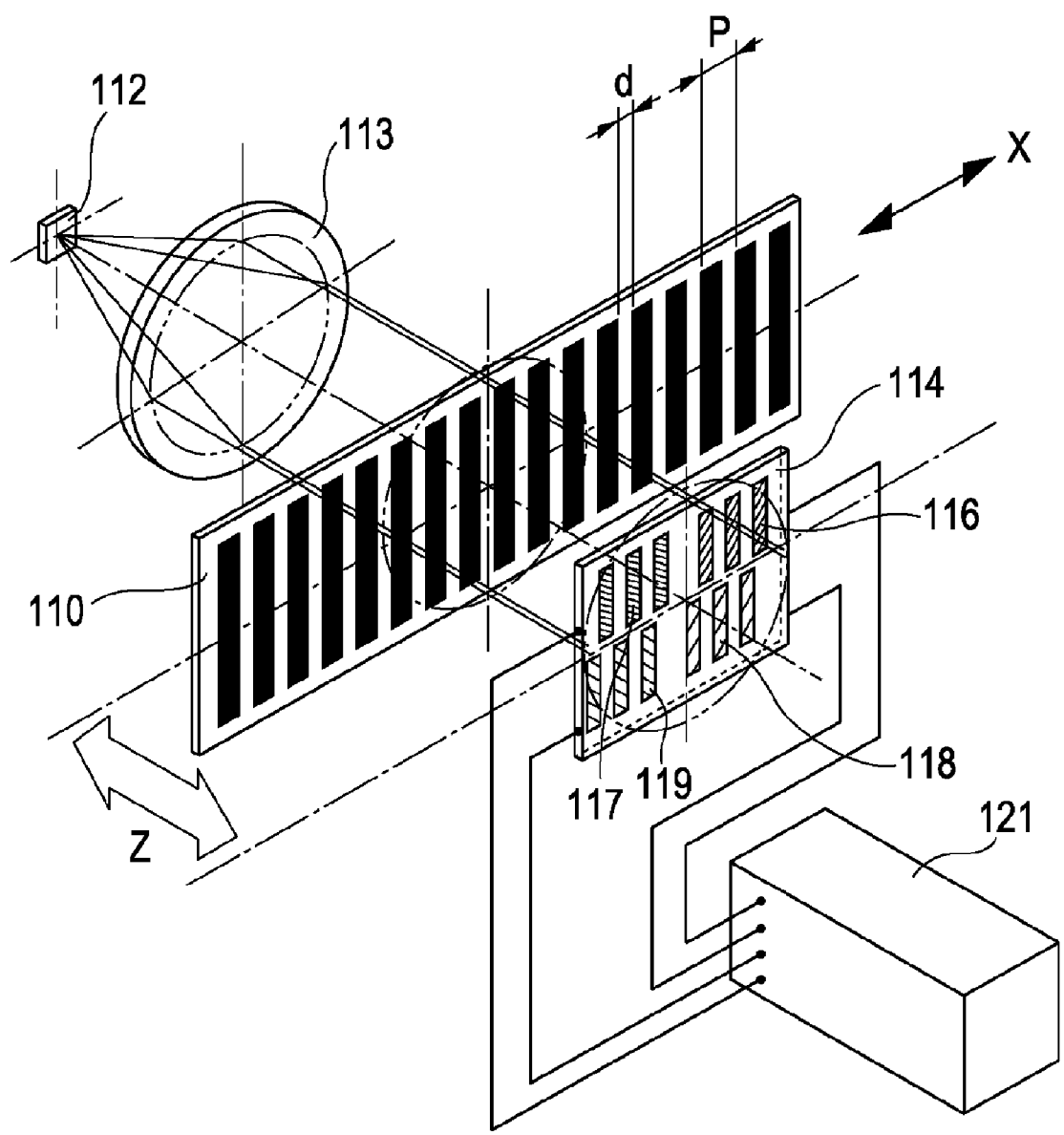
FIG. 1 is a schematic illustration of the structure of an optical encoder and an optical system according to a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art can not be discussed in detail but are intended to be part of the enabling description where appropriate, for example the fabrication of gratings and their materials.

In all of the examples illustrated and discussed herein any specific values, for example the pitch and aspect ratios, should be interpreted to be illustrative only and non limiting. Thus, other examples of the exemplary embodiments could have different values.

Notice that similar reference numerals and letters refer to similar items in the following figures, and thus once an item is defined in one figure, it can not be discussed for following figures.

Note that herein when referring to correcting or corrections of an error (e.g., an aberration), a reduction of the error and/or a correction of the error is intended.

First Exemplary Embodiment

Exemplary embodiments of the present invention are described below with reference to the accompanying drawings. FIG. 1 is a schematic illustration of the structure of an optical encoder according to a first exemplary embodiment of the present invention.

A grating is evenly formed on a main scale 110 with a predetermined spacing between the slits thereof. The main scale 110 is secured to a moving object to be measured and moves in the grating arrangement direction indicated by an arrow in FIG. 1 (the x-axis direction).

Additionally, the main scale 110 receives light from a light source 112 and forms interference fringes on the side remote from the light source 112. In the first exemplary embodiment, the grating formed on the main scale 110 functions as a square wave amplitude grating (a first grating).

A light-receiving-element array 114 is secured at a position at which the interference fringes caused by the diffraction of the main scale 110 are formed. On the light-receiving element array 114, light-receiving elements are disposed in four areas in a lattice pattern. These four areas, namely, upper, lower, left, and right areas in FIG. 1 are described next.

As shown in FIG. 1, upper-right light-receiving elements (a-phase right light-receiving elements) 116 form a lattice having a pitch that is the same as the pitch of the interference fringes. Similarly, upper-left light-receiving elements (b-phase right light-receiving elements) 117 form a lattice having a pitch that is the same as the pitch of the interference fringes. Lower-right light-receiving elements (c-phase right light-receiving elements) 118 form a lattice having a pitch that is the same as the pitch of the interference fringes. Lower-left light-receiving elements (d-phase right light-receiving elements) 119 form a lattice having a pitch that is the same as the pitch of the interference fringes. These light-receiving elements are arranged so as to have a ¼ pitch difference, that is, each is 90° out-of-phase with respect to its neighbors.

When the a-phase is a reference phase, the b-phase is 90°, the c-phase is 180°, and the d-phase is 270°. When receiving light, each of the a-phase light-receiving elements 116, the b-phase light-receiving elements 117, the c-phase light-receiving elements 118, and the d-phase light-receiving elements 119 generates a voltage in accordance with the intensity of the received light. Accordingly, each of the a-phase light-receiving elements 116, b-phase light-receiving elements 117, c-phase light-receiving elements 118, and d-phase light-receiving elements 119 outputs a voltage signal varying with the movement of the main scale 110.

At the positions of the light-receiving elements 116-119, an index scale (a second grating) including a-phase to d-phase detection optical gratings can be disposed in place of the light-receiving elements 116-119, and, behind the index scale, light-receiving elements a-d corresponding to the index scale can be disposed.

Output signals from the a-phase light-receiving elements 116, the b-phase light-receiving elements 117, the c-phase light-receiving elements 118, and the d-phase light-receiving elements 119 are delivered to an electrical circuit unit 121.

Figure 2A:
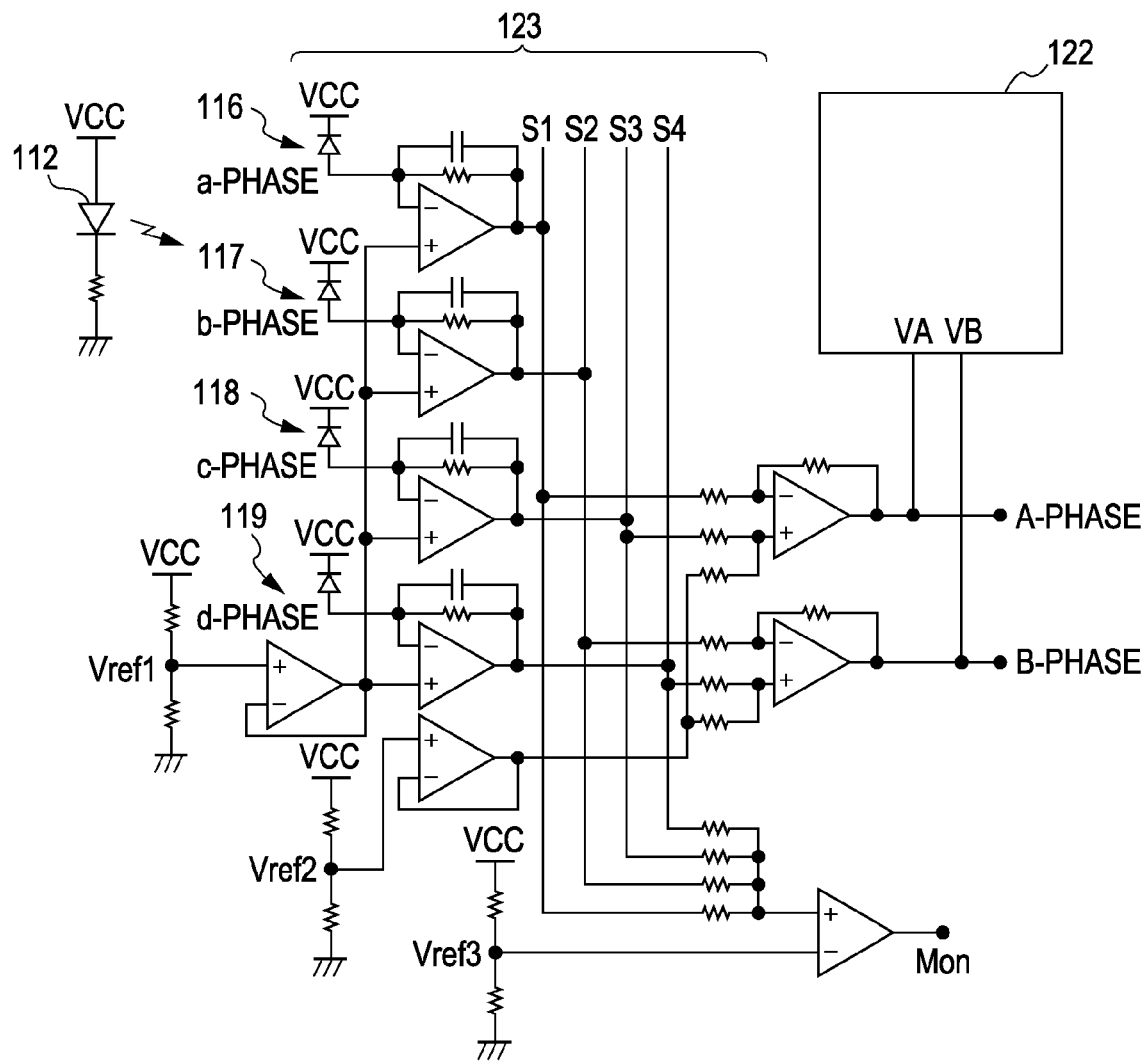
FIGS. 2A and 2B are schematic illustrations of a circuit diagram of an electrical circuit unit.
Figure 2B:
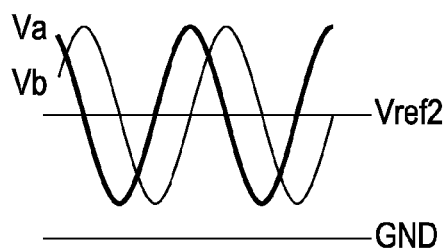

FIGS. 2A and 2B are schematic illustrations of a circuit diagram of the electrical circuit unit 121.

The electrical circuit unit 121 includes an illumination circuit of the light source 112, an analog signal processing unit 123, and a position computing unit 122. The position computing unit 122 detects the position of the object to be measured by computing the amount of movement of the main scale 110.

In the analog signal processing unit 123, four signal amplifier circuits are connected to the set of the a-phase light-receiving elements 116, the set of the b-phase light-receiving elements 117, the set of the c-phase light-receiving elements 118, and the set of the d-phase light-receiving elements 119, respectively. Each of an A-phase signal and a B-phase signal is obtained as a difference output corresponding to the difference between two signals in opposite phases among four amplified signals from the four signal amplifier circuits. More specifically, the A-phase signal is obtained as a difference output corresponding to the difference between an a-phase amplified signal and a c-phase amplified signal. The B-phase signal is obtained as a difference output corresponding to the difference between a b-phase amplified signal and a d-phase amplified signal.

An output signal VA output from the analog signal processing unit 123 to the position computing unit 122 is the sum of an alternate current component Va and a direct current component Vref2. Similarly, an output signal VB output from the analog signal processing unit 123 to the position computing unit 122 is the sum of an alternate current component Vb and the direct current component Vref2.

The position computing unit 122 counts peaks in the A-phase output signal (VA=Va+Vref2) or B-phase output signal (VB=Vb+Vref2) so as to obtain the number of passing interference fringes formed by diffraction.

By multiplying the pitch of the interference fringes by the counted number, the amount of movement of the main scale 110 can be computed.

By computing the phase angle between A phase and B phase on the basis of the alternate current components of the A-phase and B-phase output signals, the amount of movement of the main scale 110 less than the pitch of the interference fringes can be computed.

In the first exemplary embodiment, an arctangent (ArcTan value) is computed by computing the arctangent of the A-phase and B-phase sine wave signals (also referred to as A-phase and B-phase signals) so as to obtain the phase angle.

Figure 3:
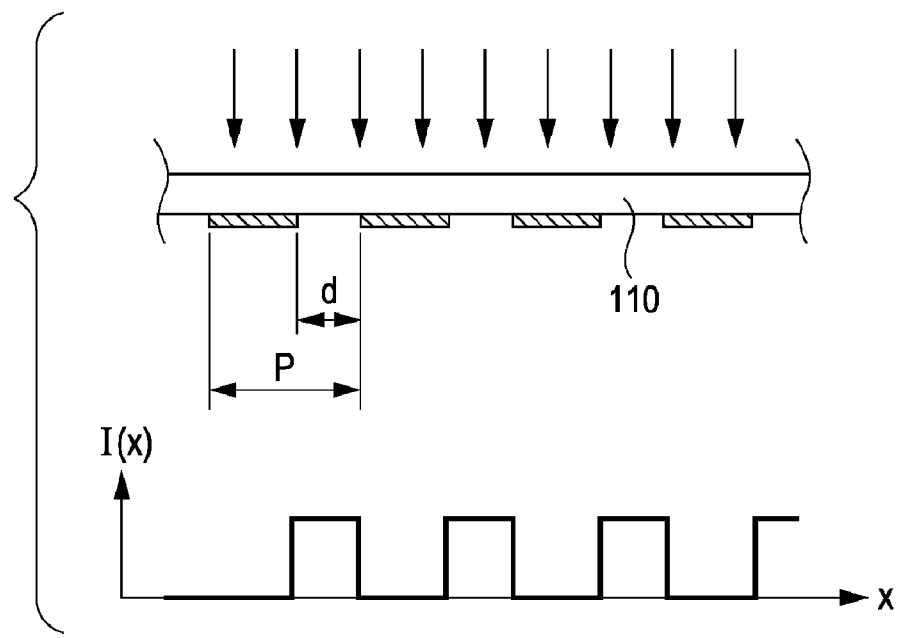
FIG. 3 is a diagram illustrating an optical scale according to the first exemplary embodiment of the present invention.

FIG. 3 is a cross-sectional view of the main scale 110 according to the first exemplary embodiment of the present invention.

In a diffraction grating disposed on the main scale 110, a plurality of gratings can be evenly arranged. The diffraction grating can be a square wave amplitude grating having a pitch of P. The width of a transmissive portion (i.e., an optical effective aperture) of the diffraction grating is d.

Let AR denote the ratio of an optical effective aperture to the pitch P (aperture ratio). Then, AR is defined as follows:

$$AR = \frac{d}{p} \times 100(\%) \quad (4)$$

Divergent light beams emitted from the light source 112 are changed to substantially parallel light beams by a collimator lens 113 and is made incident on the main scale 110.

At that time, the main scale 110 is displaced in the x-axis direction. The direction of the gap is the z-axis direction. The intensity transmission ratio distribution I(x, z) of the main scale 110 exhibits a square pattern, as shown in the lower portion of FIG. 3 at a position of Z=0. Then, I(x, 0) is expressed as follows:

$$I(x, 0) = C \cdot \sum_{n=1}^{\infty} \frac{1 - \cos(2n\pi a/P)}{n} \sin(2n\pi x/P) + C \cdot \sum_{n=1}^{\infty} \frac{\sin(2n\pi a/P)}{n} \cos(2n\pi x/P) + D \quad (5)$$

where C and D are constant values.

According to at least one exemplary embodiment of the present invention, the aperture ratio AR of the main scale 110 can be considered to be a primary design parameter and the aperture ratio AR is optimized so that the target high-order harmonic distortion component is minimal.

According to the first exemplary embodiment, the amplitude of the unnecessary third-order harmonic wave component contained in the A-phase and B-phase signals, which are displacement signals, is reduced. A method of reducing the amplitude is described next.

First, the method of computing the diffraction according to this exemplary embodiment is briefly described.

According to the first exemplary embodiment, when the diffraction grating disposed on the main scale 110 is irradiated with light beams from the light source, the diffracted light beams generated by the grating are naturally overlapped. The light intensity distribution formed in the overlapping area of the diffracted light beams behind the grating is obtained using the diffraction computation.

There are two diffraction theories. The first theory is a scalar diffraction theory that neglects the effect of electromagnetic characteristics of the polarization of light and an aperture. The second theory is a vector diffraction theory that takes into account such an effect.

In this exemplary embodiment, the diffraction computation is carried out on the basis of the scalar diffraction theory although in other exemplary embodiments, vector diffraction theory can be used. When the scalar diffraction theory is applied, it is assumed that the gap between the main scale and the index scale is greater than at least one wavelength.

In addition, when $\lambda$ denotes the wavelength of the light source and $\lambda$ is set to, for example, 0.65 μm, the scalar diffraction theory provides a profile that is almost the same as the exact solution for a pitch that is more than about ten times $\lambda$ (i.e., P>about 6.5 μm).

Figure 4:
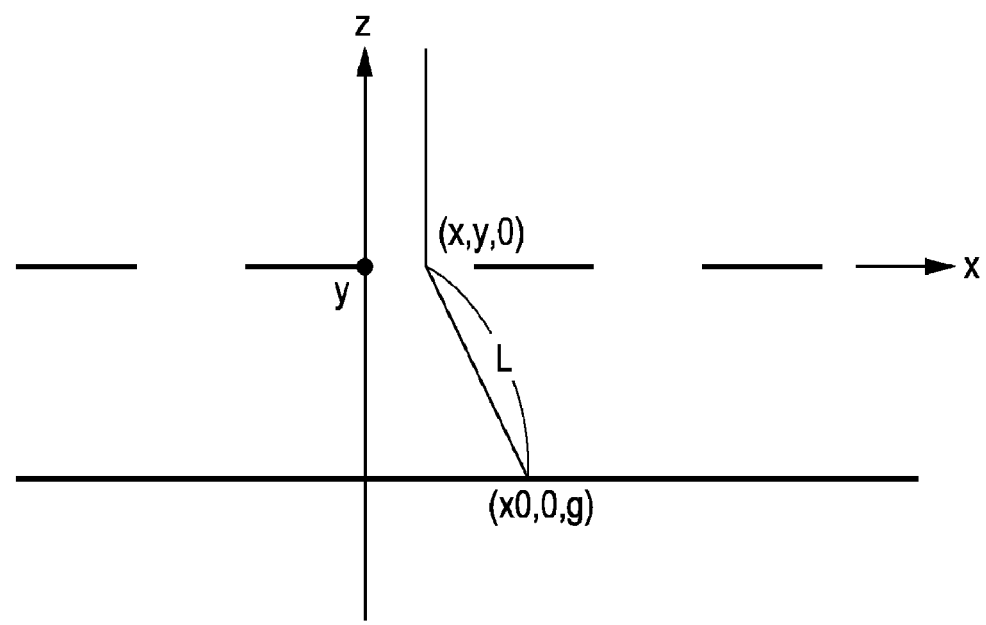
FIG. 4 is a diagram illustrating a computational expression according to the diffraction theory.

According to the scalar diffraction theory, in general, the result of the diffraction computation is expressed as the Fresnel integral. In the Fresnel integral, in FIG. 4, L is approximated as follows:

$$L = \sqrt{(x_0 - x)^2 + y^2 + g^2} \qquad (6)$$
$$\approx g + ((x_0 - x)^2 + y^2)/2g$$

Thereafter, a diffraction integration operation is carried out with respect to the entire aperture so as to obtain the result of the diffraction computation. By setting the inclination factor to be constant, the Fresnel integral is expressed as follows:

$$I(x) = |\iint_{aperture} \exp(ikL)dxdy|^2 \qquad (7)$$

It is noted that only Fraunhofer diffraction occurs on the diffraction surface. Even when the scalar diffraction theory is applied, the image amplitude distribution can be expressed as a sum of plane waves. At that time, the intensity distribution I is expressed as follows:

$$I(x) = \left|\sum_n T_n \exp(-i\beta_n x - i\gamma_n g)\right|^2 \qquad (8)$$

where $T_n$ represents the amplitude of the nth-order diffracted light, $\beta_n = \beta_0 + 2n\pi/d$, $\beta_0 = k \cdot \sin\theta_0$, $\gamma_n = \sqrt{k^2 - \beta_n^2}$, and k represents a wave number ($k = 2\pi/\lambda$).

Although, in an actual computation, equations (7) and (8) provide slightly different results, the results are substantially equal in the above-described application.

In addition, in the computation result in the form of the Fresnel integral, a large number of small ripples occur in the intensity profile. The shape of the ripples varies depending on the integral range. It is noted that no ripples appear in equation (8), which is a representation of the overlap of traveling plane waves. In addition, the calculation of equation (8) is simplified.

Furthermore, when considering a spatial frequency component relating to the waveform distortion here, the harmonic distortion components are in the range of about 3rd order to 9th order (at the highest). Accordingly, up to 5th-order diffracted waves can be satisfactory when considering the spatial frequency component relating to the waveform distortion.

Table 1 shows a relationship between the combination of the diffraction waves and the order of a generated harmonic component.

TABLE 1

RELATIONSHIP BETWEEN COMBINATION OF DIFFRACTION ORDERS AND HARMONIC WAVEFORM DISTORTION ORDER

| DIFFRACTION ORDERS | -10 | -9 | -8 | -7 | -6 | -5 | -4 | -3 | -2 | -1 | 0 | 1 | 2 | 3 | 4 | 5 | 6 | 7 | 8 | 9 | 10 |
|---|---|---|---|---|---|---|---|---|---|---|---|---|---|---|---|---|---|---|---|---|---|
| -10 |  | 1 | 2 | 3 | 4 | 5 | 6 | 7 | 8 | 9 | 10 | 11 | 12 | 13 | 14 | 15 | 16 | 17 | 18 | 19 | 20 |
| -9 |  |  | 1 | 2 | 3 | 4 | 5 | 6 | 7 | 8 | 9 | 10 | 11 | 12 | 13 | 14 | 15 | 16 | 17 | 18 | 19 |
| -8 |  |  |  | 1 | 2 | 3 | 4 | 5 | 6 | 7 | 8 | 9 | 10 | 11 | 12 | 13 | 14 | 15 | 16 | 17 | 18 |
| -7 |  |  |  |  | 1 | 2 | 3 | 4 | 5 | 6 | 7 | 8 | 9 | 10 | 11 | 12 | 13 | 14 | 15 | 16 | 17 |
| -6 |  |  |  |  |  | 1 | 2 | 3 | 4 | 5 | 6 | 7 | 8 | 9 | 10 | 11 | 12 | 13 | 14 | 15 | 16 |
| -5 |  |  |  |  |  |  | 1 | 2 | 3 | 4 | 5 | 6 | 7 | 8 | 9 | 10 | 11 | 12 | 13 | 14 | 15 |
| -4 |  |  |  |  |  |  |  | 1 | 2 | 3 | 4 | 5 | 6 | 7 | 8 | 9 | 10 | 11 | 12 | 13 | 14 |
| -3 |  |  |  |  |  |  |  |  | 1 | 2 | 3 | 4 | 5 | 6 | 7 | 8 | 9 | 10 | 11 | 12 | 13 |
| -2 |  |  |  |  |  |  |  |  |  | 1 | 2 | 3 | 4 | 5 | 6 | 7 | 8 | 9 | 10 | 11 | 12 |
| -1 |  |  |  |  |  |  |  |  |  |  | 1 | 2 | 3 | 4 | 5 | 6 | 7 | 8 | 9 | 10 | 11 |
| 0 |  |  |  |  |  |  |  |  |  |  |  | 1 | 2 | 3 | 4 | 5 | 6 | 7 | 8 | 9 | 10 |
| 1 |  |  |  |  |  |  |  |  |  |  |  |  | 1 | 2 | 3 | 4 | 5 | 6 | 7 | 8 | 9 |

TABLE 1-continued

RELATIONSHIP BETWEEN COMBINATION OF DIFFRACTION ORDERS AND
HARMONIC WAVEFORM DISTORTION ORDER

| | | | | | | | | | | | | | | | | |
|---|---|---|---|---|---|---|---|---|---|---|---|---|---|---|---|---|
| 2 | | | | | | | | | | 1 | 2 | 3 | 4 | 5 | 6 | 7 | 8 |
| 3 | | | | | | | | | | | 1 | 2 | 3 | 4 | 5 | 6 | 7 |
| 4 | | | | | | | | | | | | 1 | 2 | 3 | 4 | 5 | 6 |
| 5 | | | | | | | | | | | | | 1 | 2 | 3 | 4 | 5 |
| 6 | | | | | | | | | | | | | | 1 | 2 | 3 | 4 |
| 7 | | | | | | | | | | | | | | | 1 | 2 | 3 |
| 8 | | | | | | | | | | | | | | | | 1 | 2 |
| 9 | | | | | | | | | | | | | | | | | 1 |
| 10 | | | | | | | | | | | | | | | | | |

RANGE OF 3RD HARMONIC (TARGET DISTORTION COMPONENT OF THE PRESENT EXEMPLARY EMBODIMENT)

In this exemplary embodiment, the elimination of the third harmonic component is discussed.

In terms of the diffraction intensity, the intensity level of the 5th-order diffracted light is neglected. The computation is carried out in the range of up to ±3rd-order diffracted light.

Accordingly, in the square wave amplitude grating, combinations of 0th-order, ±1st-order, ±2nd-order, and ±3rd-order diffracted light mainly have an impact on the generation of the third harmonic component. Only the combinations (0, +3), (0, −3), (+1, −2), and (−1, +2) generate the 3rd harmonic component.

In this exemplary embodiment, the aperture width of each light-receiving element of the index scale is ½ of the pitch P of the index scale.

Furthermore, since the electric signal processing circuit carries out a differential amplification of a 180° inverted signal, even-order harmonic components (such as second, fourth, and sixth harmonic components) are canceled.

Figure 6A:
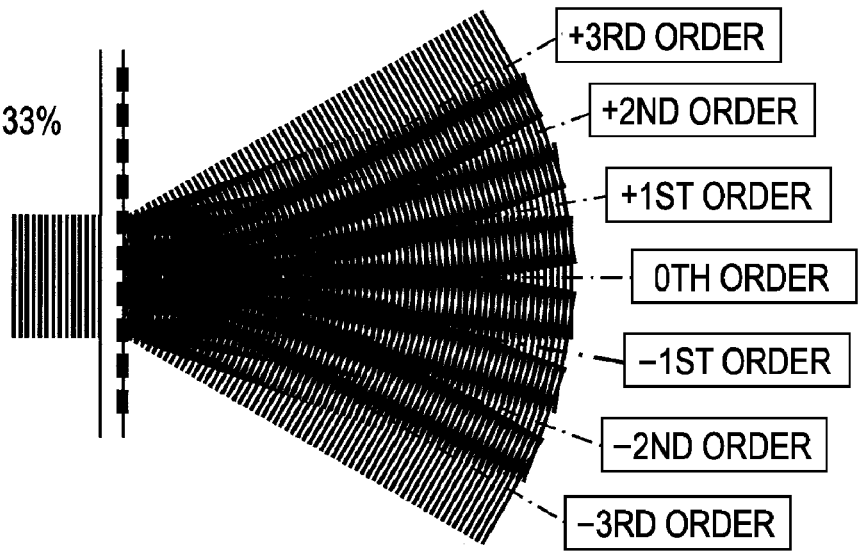
FIGS. 6A-C are diagrams illustrating a relationship between an aperture ratio AR of a scale and actual diffracted light.
Figure 6B:
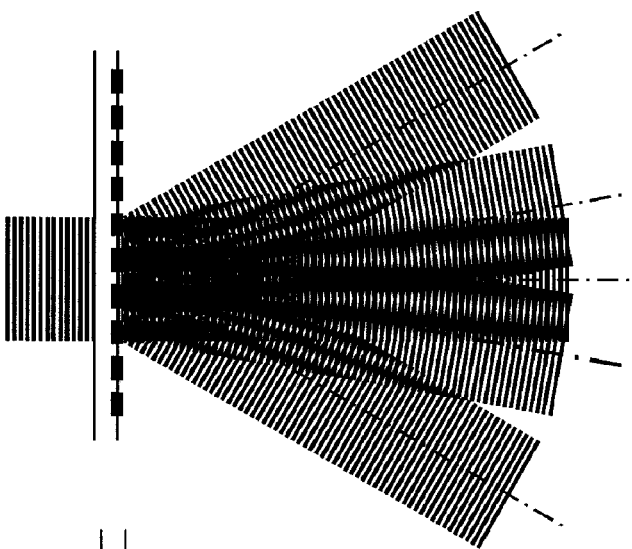
Figure 6C:
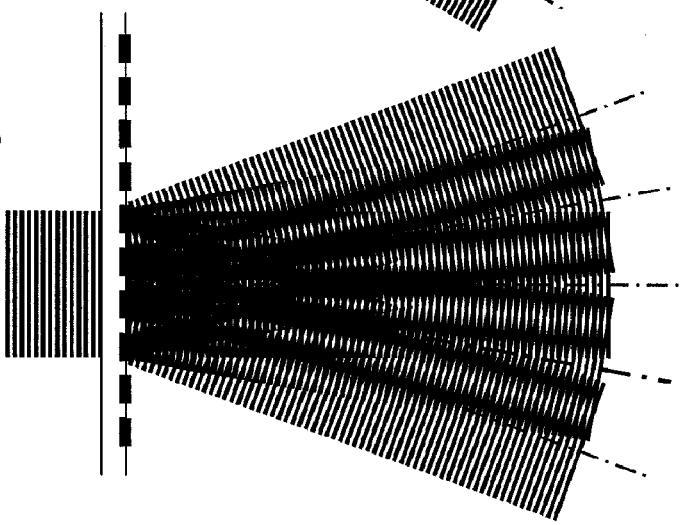

The occurrence of 0th-order diffraction waves and ±1st-order to ±3rd-order diffraction waves relating to the present exemplary embodiment is illustrated in FIGS. 6A-C.

Figure 5:
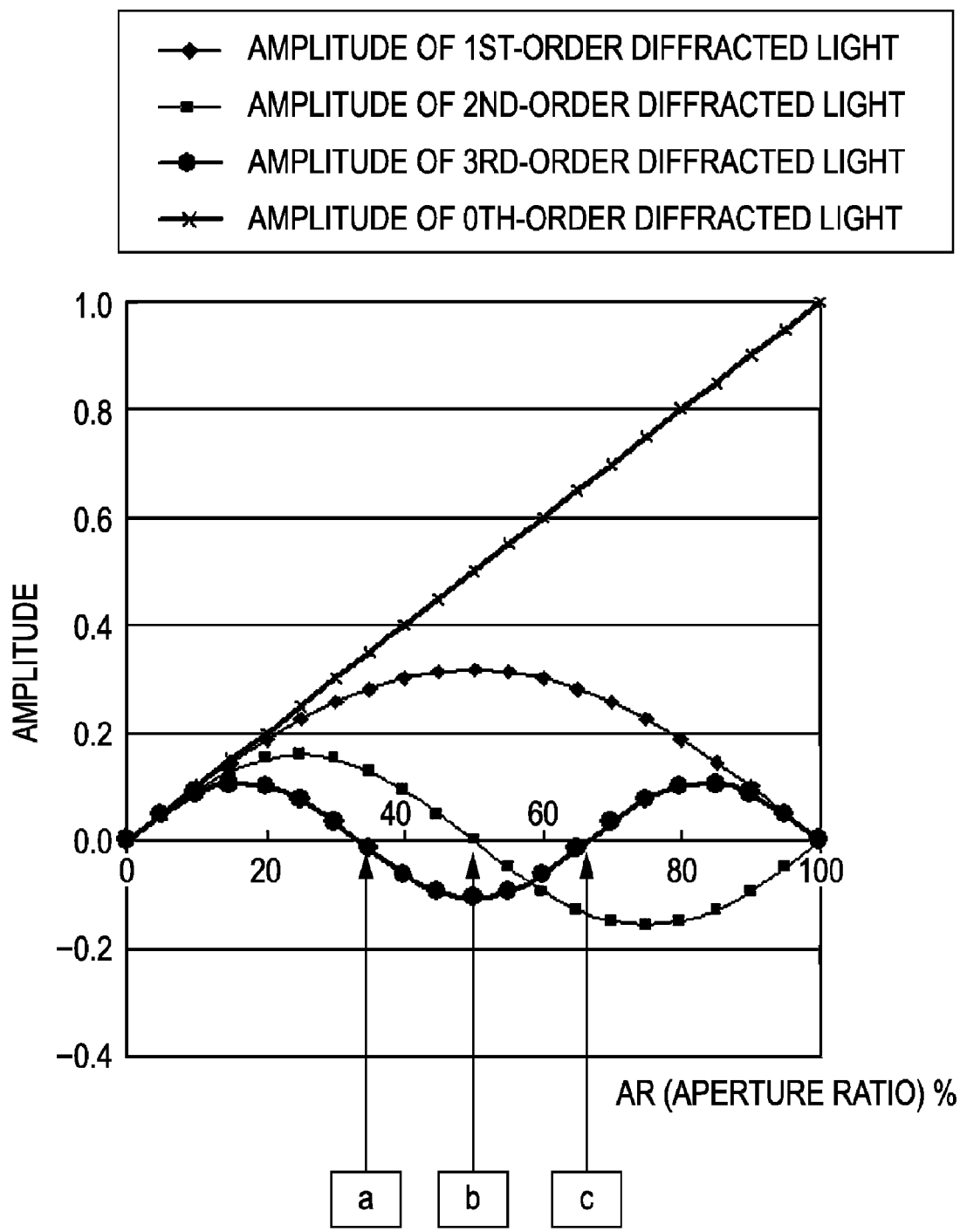
FIG. 5 is a diagram illustrating the diffraction efficiency of a square wave amplitude grating.

Points "a" and "c" in FIG. 5 correspond to the aperture ratio AR=33.33% and AR=66.67%, respectively. At those points, the 3rd-order diffracted light is a missing order. A point "b" in FIG. 5 corresponds to the aperture ratio AR=50%. At that point, the 2nd-order diffracted light is a missing order.

The diffraction waves shown in FIGS. 6B and 6C correspond to the points "b" and "a" shown in FIG. 5, respectively.

As noted above, according to at least one exemplary embodiment of the present invention, in order to obtain the profile of a diffraction image generated by the square wave amplitude grating on the main scale, the diffraction calculation based on a plane wave expansion is carried out even when the observation point is not a far-field.

Additionally, in order to simplify and speed up the calculation, the amplitude of a diffracted light beam corresponding to the coefficient $T_n$ in equation (7) is expressed as follows:

Note that the following equations (9) and (10) for representing the diffraction intensities of the square wave amplitude grating are used:

$$I = I_0 (AR)^2 \qquad (9)$$

when the diffraction order m=0 (i.e., in the case of the 0th-order diffracted light).

$$I = I_0 = \left( \frac{\sin(ARm\pi)}{m\pi} \right)^2 \qquad (10)$$

when the diffraction order m≠0.

By neglecting $I_0$, the amplitudes are:

$$T_0 = AR \qquad (11)$$

when the diffraction order m=0 (i.e., in the case of the 0th-order diffracted light).

$$T_m = \frac{\sin(AR\, m\, \pi)}{m\, \pi} \qquad (12)$$

when the diffraction order m≠0.

FIG. 5 illustrates the relationship between the optical effective aperture ratio AR of the diffraction grating and the amplitude of diffraction.

The diffraction waves are expressed as plane waves in the form of complex numbers using these amplitudes. In these expressions, d represents the aperture width of the main scale, P represents the pitch of the main scale, λ represents the wavelength of a light source, z represents the gap direction, and x represents the scale displacement direction.

Here, it is assumed that the grating expands to infinity in the y-axis direction and the effect in the y-axis direction is neglected.

Let U0, U1p, U1m, U2p, U2m, U3p, and U3m denote seven plane wave amplitudes of the 0th- and ±1st- to 3rd-diffracted light, respectively. Then, the amplitudes of the diffracted light beams are expressed by the following equations (13) to (19):

0th-other diffracted light amplitude $U0$ (13)

$$u0 = \left(\frac{d}{p}\right)\text{Exp}\left[I\left(\frac{2\pi}{\lambda}z\right)\right]$$

+1st-other diffracted light amplitude $U1p$ (14)

$$u1p = \frac{\text{Sin}\left[\frac{d\pi}{p}\right]}{\pi}\text{Exp}\left[I\left(-\frac{2\pi}{p}x + \frac{2\pi\sqrt{1-\frac{\lambda^2}{p^2}}}{\lambda}z\right)\right]$$

−1st-other diffracted light amplitude $U1m$ (15)

$$u1m = \frac{\text{Sin}\left[\frac{d\pi}{p}\right]}{\pi}\text{Exp}\left[I\left(\frac{2\pi}{p}x + \frac{2\pi\sqrt{1-\frac{\lambda^2}{p^2}}}{\lambda}z\right)\right]$$

+2nd-other diffracted light amplitude $U2p$ (16)

$$u2p = \frac{\text{Sin}\left[\frac{2d\pi}{p}\right]}{2\pi}\text{Exp}\left[I\left(-\frac{4\pi}{p}x + \frac{2\pi\sqrt{1-\frac{4\lambda^2}{p^2}}}{\lambda}z\right)\right]$$

−2nd-other diffracted light amplitude $U2m$ (17)

$$u2m = \frac{\text{Sin}\left[\frac{2d\pi}{p}\right]}{2\pi}\text{Exp}\left[I\left(\frac{4\pi}{p}x + \frac{2\pi\sqrt{1-\frac{4\lambda^2}{p^2}}}{\lambda}z\right)\right]$$

+3rd-other diffracted light amplitude $U3p$ (18)

$$u3p = \frac{\text{Sin}\left[\frac{3d\pi}{p}\right]}{3\pi}\text{Exp}\left[I\left(-\frac{6\pi}{p}x + \frac{2\pi\sqrt{1-\frac{9\lambda^2}{p^2}}}{\lambda}z\right)\right]$$

−3rd-other diffracted light amplitude $U3m$ (19)

$$u3m = \frac{\text{Sin}\left[\frac{3d\pi}{p}\right]}{3\pi}\text{Exp}\left[I\left(\frac{6\pi}{p}x + \frac{2\pi\sqrt{1-\frac{9\lambda^2}{p^2}}}{\lambda}z\right)\right]$$

Subsequently, the combined amplitude of seven waves of the 0th- and ±1st- to 3rd-order diffracted light (i.e., the sum of these seven waves) is computed. The resulting value is then multiplied by the complex conjugate number to obtain the combined intensity.

Let UU0, UU1p, UU1m, UU2p, UU2m, UU3p, and UU3m denote the corresponding complex conjugate numbers. Then, the combined waves f1 and f2 are expressed as follows:

$$f1 = u0 + u1p + u1m + u2p + u2m + u3p + u3m \quad (20)$$

$$f2 = uu0 + uu1p + uu1m + uu2p + uu2m + uu3p + uu3m \quad (21)$$

The interference image arising from the diffraction grating on the main scale can be obtained by multiplying the sum f1 of the complex amplitudes by its complex conjugate number f2. That is, by substituting AR with d/p (AR=d/p), the combined intensity I(x, z, AR, λ) is rewritten as follows:

$$I(x, z, d, p, \lambda) = f1 \times f2 \quad (22)$$

(23)

-continued $$I[x, z, d, \lambda] = \frac{d^2}{p^2} + \frac{2d\text{Cos}\left[\frac{2\pi x}{p} + \frac{2\pi z}{\lambda} - \frac{2\pi z\sqrt{1-\frac{\lambda^2}{p^2}}}{\lambda}\right]\text{Sin}\left[\frac{d\pi}{p}\right]}{p\pi} +$$

$$\frac{2d\text{Cos}\left[\frac{2\pi x}{p} - \frac{2\pi z}{\lambda} + \frac{2\pi z\sqrt{1-\frac{\lambda^2}{p^2}}}{\lambda}\right]\text{Sin}\left[\frac{d\pi}{p}\right]}{p\pi} +$$

$$\frac{2\text{Sin}\left[\frac{d\pi}{p}\right]^2}{\pi^2} + \frac{2\text{Cos}\left[\frac{4\pi x}{p}\right]\text{Sin}\left[\frac{d\pi}{p}\right]^2}{\pi^2} +$$

$$\frac{d\text{Cos}\left[\frac{4\pi x}{p} + \frac{2\pi z}{\lambda} - \frac{2\pi z\sqrt{1-\frac{4\lambda^2}{p^2}}}{\lambda}\right]\text{Sin}\left[\frac{2d\pi}{p}\right]}{p\pi} +$$

$$\frac{d\text{Cos}\left[\frac{4\pi x}{p} - \frac{2\pi z}{\lambda} + \frac{2\pi z\sqrt{1-\frac{4\lambda^2}{p^2}}}{\lambda}\right]\text{Sin}\left[\frac{2d\pi}{p}\right]}{p\pi} +$$

$$\frac{\text{Cos}\left[\frac{2\pi x}{p} + \frac{2\pi z\sqrt{1-\frac{4\lambda^2}{p^2}}}{\lambda} - \frac{2\pi z\sqrt{1-\frac{\lambda^2}{p^2}}}{\lambda}\right]\text{Sin}\left[\frac{d\pi}{p}\right]\text{Sin}\left[\frac{2d\pi}{p}\right]}{\pi^2} +$$

$$\frac{\text{Cos}\left[\frac{6\pi x}{p} + \frac{2\pi z\sqrt{1-\frac{4\lambda^2}{p^2}}}{\lambda} - \frac{2\pi z\sqrt{1-\frac{\lambda^2}{p^2}}}{\lambda}\right]\text{Sin}\left[\frac{d\pi}{p}\right]\text{Sin}\left[\frac{2d\pi}{p}\right]}{\pi^2} +$$

$$\frac{\text{Cos}\left[\frac{2\pi x}{p} - \frac{2\pi z\sqrt{1-\frac{4\lambda^2}{p^2}}}{\lambda} + \frac{2\pi z\sqrt{1-\frac{\lambda^2}{p^2}}}{\lambda}\right]\text{Sin}\left[\frac{d\pi}{p}\right]\text{Sin}\left[\frac{2d\pi}{p}\right]}{\pi^2} +$$

$$\frac{\text{Cos}\left[\frac{6\pi x}{p} - \frac{2\pi z\sqrt{1-\frac{4\lambda^2}{p^2}}}{\lambda} + \frac{2\pi z\sqrt{1-\frac{\lambda^2}{p^2}}}{\lambda}\right]\text{Sin}\left[\frac{d\pi}{p}\right]\text{Sin}\left[\frac{2d\pi}{p}\right]}{\pi^2} +$$

$$\frac{\text{Sin}\left[\frac{2d\pi}{p}\right]^2}{2\pi^2} + \frac{\text{Cos}\left[\frac{8\pi x}{p}\right]\text{Sin}\left[\frac{2d\pi}{p}\right]^2}{2\pi^2} +$$

$$\frac{2d\text{Cos}\left[\frac{6\pi x}{p} + \frac{2\pi z}{\lambda} - \frac{2\pi z\sqrt{1-\frac{9\lambda^2}{p^2}}}{\lambda}\right]\text{Sin}\left[\frac{3d\pi}{p}\right]}{3p\pi} +$$

$$\frac{2d\text{Cos}\left[\frac{6\pi x}{p} - \frac{2\pi z}{\lambda} + \frac{2\pi z\sqrt{1-\frac{9\lambda^2}{p^2}}}{\lambda}\right]\text{Sin}\left[\frac{3d\pi}{p}\right]}{3p\pi} +$$

$$\frac{2\text{Cos}\left[\frac{4\pi x}{p} + \frac{2\pi z\sqrt{1-\frac{9\lambda^2}{p^2}}}{\lambda} - \frac{2\pi z\sqrt{1-\frac{\lambda^2}{p^2}}}{\lambda}\right]\text{Sin}\left[\frac{d\pi}{p}\right]\text{Sin}\left[\frac{3d\pi}{p}\right]}{3\pi^2} +$$

-continued $$\frac{2\cos\left[\frac{8\pi x}{p} + \frac{2\pi z\sqrt{1-\frac{9\lambda^2}{p^2}}}{\lambda} - \frac{2\pi z\sqrt{1-\frac{\lambda^2}{p^2}}}{\lambda}\right]\sin\left[\frac{d\pi}{p}\right]\sin\left[\frac{3d\pi}{p}\right]}{3\pi^2} +$$

$$\frac{2\cos\left[\frac{4\pi x}{p} - \frac{2\pi z\sqrt{1-\frac{9\lambda^2}{p^2}}}{\lambda} + \frac{2\pi z\sqrt{1-\frac{\lambda^2}{p^2}}}{\lambda}\right]\sin\left[\frac{d\pi}{p}\right]\sin\left[\frac{3d\pi}{p}\right]}{3\pi^2} +$$

$$\frac{2\cos\left[\frac{8\pi x}{p} - \frac{2\pi z\sqrt{1-\frac{9\lambda^2}{p^2}}}{\lambda} + \frac{2\pi z\sqrt{1-\frac{\lambda^2}{p^2}}}{\lambda}\right]\sin\left[\frac{d\pi}{p}\right]\sin\left[\frac{3d\pi}{p}\right]}{3\pi^2} +$$

$$\frac{\cos\left[\frac{2\pi x}{p} + \frac{2\pi z\sqrt{1-\frac{9\lambda^2}{p^2}}}{\lambda} - \frac{2\pi z\sqrt{1-\frac{4\lambda^2}{p^2}}}{\lambda}\right]\sin\left[\frac{2d\pi}{p}\right]\sin\left[\frac{3d\pi}{p}\right]}{3\pi^2} +$$

$$\frac{\cos\left[\frac{10\pi x}{p} + \frac{2\pi z\sqrt{1-\frac{9\lambda^2}{p^2}}}{\lambda} - \frac{2\pi z\sqrt{1-\frac{4\lambda^2}{p^2}}}{\lambda}\right]\sin\left[\frac{2d\pi}{p}\right]\sin\left[\frac{3d\pi}{p}\right]}{3\pi^2} +$$

$$\frac{\cos\left[\frac{2\pi x}{p} - \frac{2\pi z\sqrt{1-\frac{9\lambda^2}{p^2}}}{\lambda} + \frac{2\pi z\sqrt{1-\frac{4\lambda^2}{p^2}}}{\lambda}\right]\sin\left[\frac{2d\pi}{p}\right]\sin\left[\frac{3d\pi}{p}\right]}{3\pi^2} +$$

$$\frac{\cos\left[\frac{10\pi x}{p} - \frac{2\pi z\sqrt{1-\frac{9\lambda^2}{p^2}}}{\lambda} + \frac{2\pi z\sqrt{1-\frac{4\lambda^2}{p^2}}}{\lambda}\right]\sin\left[\frac{2d\pi}{p}\right]\sin\left[\frac{3d\pi}{p}\right]}{3\pi^2} +$$

$$\frac{2\sin\left[\frac{3d\pi}{p}\right]^2}{9\pi^2} + \frac{2\cos\left[\frac{12\pi x}{p}\right]\sin\left[\frac{3d\pi}{p}\right]^2}{9\pi^2}$$

Equation (23) represents the desired light intensity distribution.

However, since the seven waves of the 0th- and ±1st- to 3rd-order diffracted light are combined, the combined wave includes the 2nd-order harmonic, the 4th-order harmonic, the 5th-order harmonic, and 6th-order harmonic. Therefore, theoretically, the even-order harmonics are canceled. In addition, to simplify the above-described equation to obtain the intensity distribution, the 5th-order harmonic that has little impact is removed.

Thus, the even harmonic components and the 5th harmonic component are removed from the combined intensity equation (23), and only the fundamental harmonics and the 3rd harmonic components are taken into account. Then, the above-described equation is rewritten as the following combined intensity equation f3. That is, this equation f3 combines only the amplitudes of the plane waves of the fundamental harmonics (0, +1) and (0, −1) and the 3rd harmonic components (0, +3), (0, −3), (+1, −2), and (−1, +2). Thus, the equation (23) is simplified to the following equation (24):

$$f3 = u0*uu1p + u0*uu1m + uu0*u1p + u0*u1m + \quad (24)$$
$$u0*uu3p + u0*uu3m + uu0*u3p + uu0*u3m +$$
$$uu1p*u2m + uu1m*u2p + u1p*uu2m + u1m*uu2p$$

$$(25)$$

$$I[x, z, d, p, \lambda] =$$

$$\frac{2d\cos\left[\frac{2\pi x}{p} + \frac{2\pi z}{\lambda} - \frac{2\pi z\sqrt{1-\frac{\lambda^2}{p^2}}}{\lambda}\right]\sin\left[\frac{d\pi}{p}\right]}{p\pi} +$$

$$\frac{2d\cos\left[\frac{2\pi x}{p} - \frac{2\pi z}{\lambda} + \frac{2\pi z\sqrt{1-\frac{\lambda^2}{p^2}}}{\lambda}\right]\sin\left[\frac{d\pi}{p}\right]}{p\pi} +$$

$$\frac{\cos\left[\frac{6\pi x}{p} + \frac{2\pi z\sqrt{1-\frac{4\lambda^2}{p^2}}}{\lambda} - \frac{2\pi z\sqrt{1-\frac{\lambda^2}{p^2}}}{\lambda}\right]\sin\left[\frac{d\pi}{p}\right]\sin\left[\frac{2d\pi}{p}\right]}{\pi^2} +$$

$$\frac{\cos\left[\frac{6\pi x}{p} - \frac{2\pi z\sqrt{1-\frac{4\lambda^2}{p^2}}}{\lambda} + \frac{2\pi z\sqrt{1-\frac{\lambda^2}{p^2}}}{\lambda}\right]\sin\left[\frac{d\pi}{p}\right]\sin\left[\frac{2d\pi}{p}\right]}{\pi^2} +$$

$$\frac{2d\cos\left[\frac{6\pi x}{p} + \frac{2\pi z}{\lambda} - \frac{2\pi z\sqrt{1-\frac{9\lambda^2}{p^2}}}{\lambda}\right]\sin\left[\frac{3d\pi}{p}\right]}{3p\pi} +$$

$$\frac{2d\cos\left[\frac{6\pi x}{p} - \frac{2\pi z}{\lambda} + \frac{2\pi z\sqrt{1-\frac{9\lambda^2}{p^2}}}{\lambda}\right]\sin\left[\frac{3d\pi}{p}\right]}{3p\pi}$$

Figure 7A:
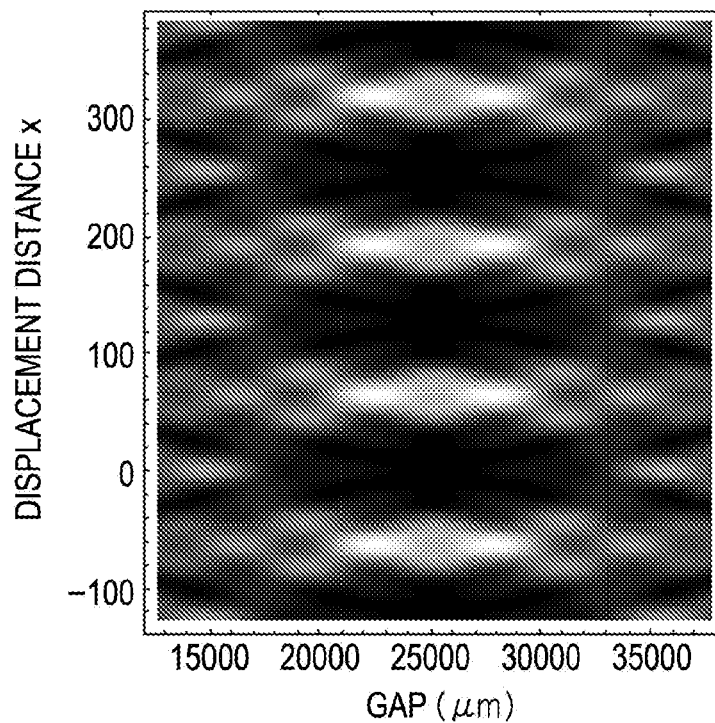
FIGS. 7A and 7B illustrate the light intensity distribution using a relationship between a displacement direction x and a gap z computed according to a scalar diffraction theory.
Figure 7B:
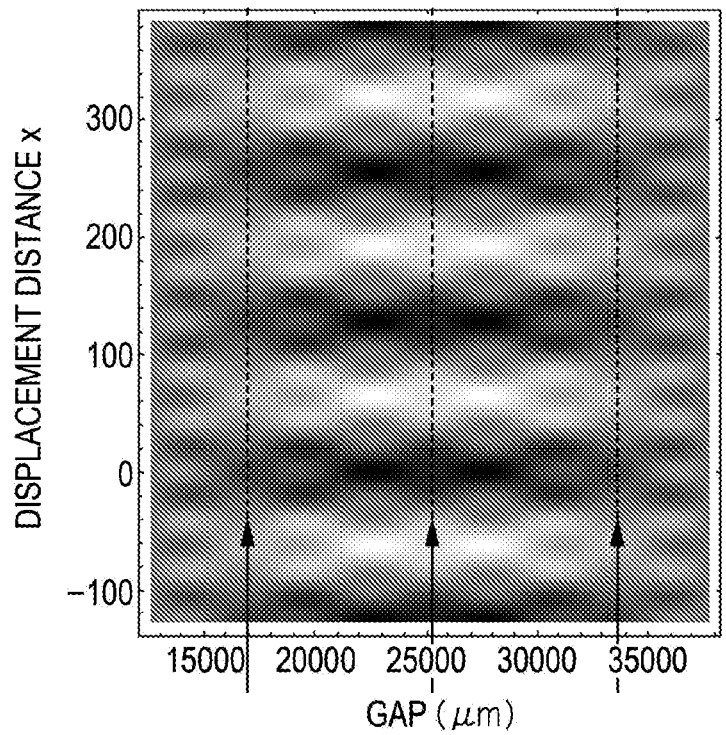

FIG. 7A illustrates the light intensity distribution according to equation (23), whereas FIG. 7B illustrates the light intensity distribution according to equation (25). In FIGS. 7A and 7B, the main scale pitch P=128 µm and the light source wavelength λ=0.65 µm.

The light intensity distribution is represented using the gap z and the displacement direction x. The area having a high intensity is indicated by a bright portion. In FIGS. 7A and 7B, the abscissa represents the gap position z and the ordinate represents the x-axis direction.

In FIG. 7A, since all of the components of the distortion are included in the equation, the even-order spatial frequencies are also included. In particular, the 2nd-order component is noticeable.

In contrast, in FIG. 7B, only the fundamental harmonics and the 3rd-order component are shown. As can be seen from the drawing, the large amplitude portions and small amplitude portions of the 3rd harmonic component are noticeable.

As described above, the light intensity distribution in, in particular, the displacement direction x is computed using the two parameters (i.e., the aperture ratio AR (=d/p) of the diffraction grating and a gap size (GAP) z between the main scale and the index scale).

The effect of elimination/reduction of the high-order harmonic distortion using this method is described next with reference to several specific examples of the designs and structures of the optical encoder.

In terms of the 3rd harmonic distortion, a relationship between the aperture ratio AR and the gap z is evaluated using equation (25) as follows.

The distortion ratio in the distribution is evaluated using equation (25), which indicates the light intensity distribution $I(x, z, AR, \lambda)$, so that the condition that minimizes the distortion is derived.

Application 1

Figure 8B:
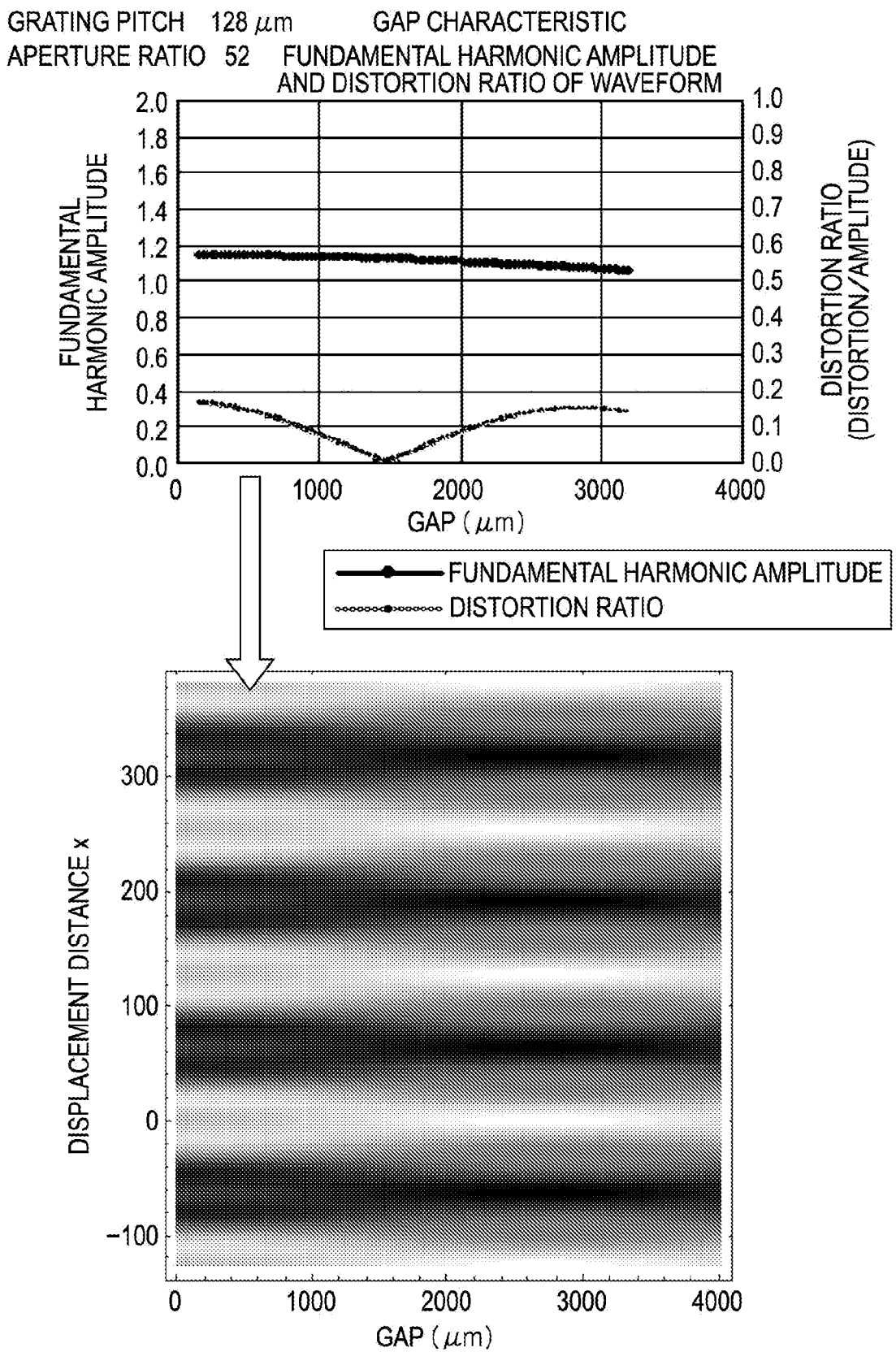

The optimal aperture of the main scale 110 is described with reference to FIGS. 8A and 8B when the light source wavelength $\lambda$ is 0.65 μm, the scale pitch of the main scale 110 is 128 μm, and the gap size is 1500 μm.

The graph in FIG. 8A illustrates a relationship between the aperture ratio AR and the distortion ratio of the 3rd-order component according to equation (25) of at least one exemplary embodiment of the present invention when the gap is 1500 μm.

In the graph shown in FIG. 8A, the abscissa represents the optical effective aperture ratio AR, the ordinate on the left represents the amplitude of the fundamental harmonic, and the ordinate on the right represents (distortion amplitude/ fundamental harmonic amplitude).

The distortion is computed by evaluating only the light intensity distribution. Accordingly, this result does not include the distortion overlapping the displacement waveforms in an actual encoder.

However, when this result is converted to that for the actual waveform of the encoder, the value is reduced to about ⅓ to ⅕ since a filtering operation is carried out in the index scale. From the graph shown in FIG. 8A, the optical effective aperture ratio AR that minimizes the distortion is determined to be 52%. The upper graph in FIG. 8B illustrates the gap characteristic curve when the aperture ratio is 52%. Only the abscissa is changed to represent the gap position z from that in the graph of FIG. 8A. As can be seen from the upper graph in FIG. 8B, the 3rd-order component is attenuated and has a minimal value at a gap of 1500 μm. The lower graph in FIG. 8B illustrates the intensity distribution density map. In this map, the abscissa represents the gap and the ordinate represents the displacement direction x. The white portions indicate the areas having a high light intensity. At the gap position at which the distortion becomes minimal, the spatial frequencies of the 3rd-order component cannot be found.

Application 2

The optimal aperture ratio of the main scale 110 is computed below when the gap size is 1000 μm.

The scale pitch of the main scale 110 is the same as that in Application 1. The light source wavelength $\lambda$ is 0.65 μm. As in Application 1, the graph in FIG. 9A illustrates a relationship between the aperture ratio AR and the distortion ratio of the 3rd-order component when the gap size is 1000 μm.

In this application, the minimal values appear at two positions where AR=44% and AR=78%.

Figure 9B:
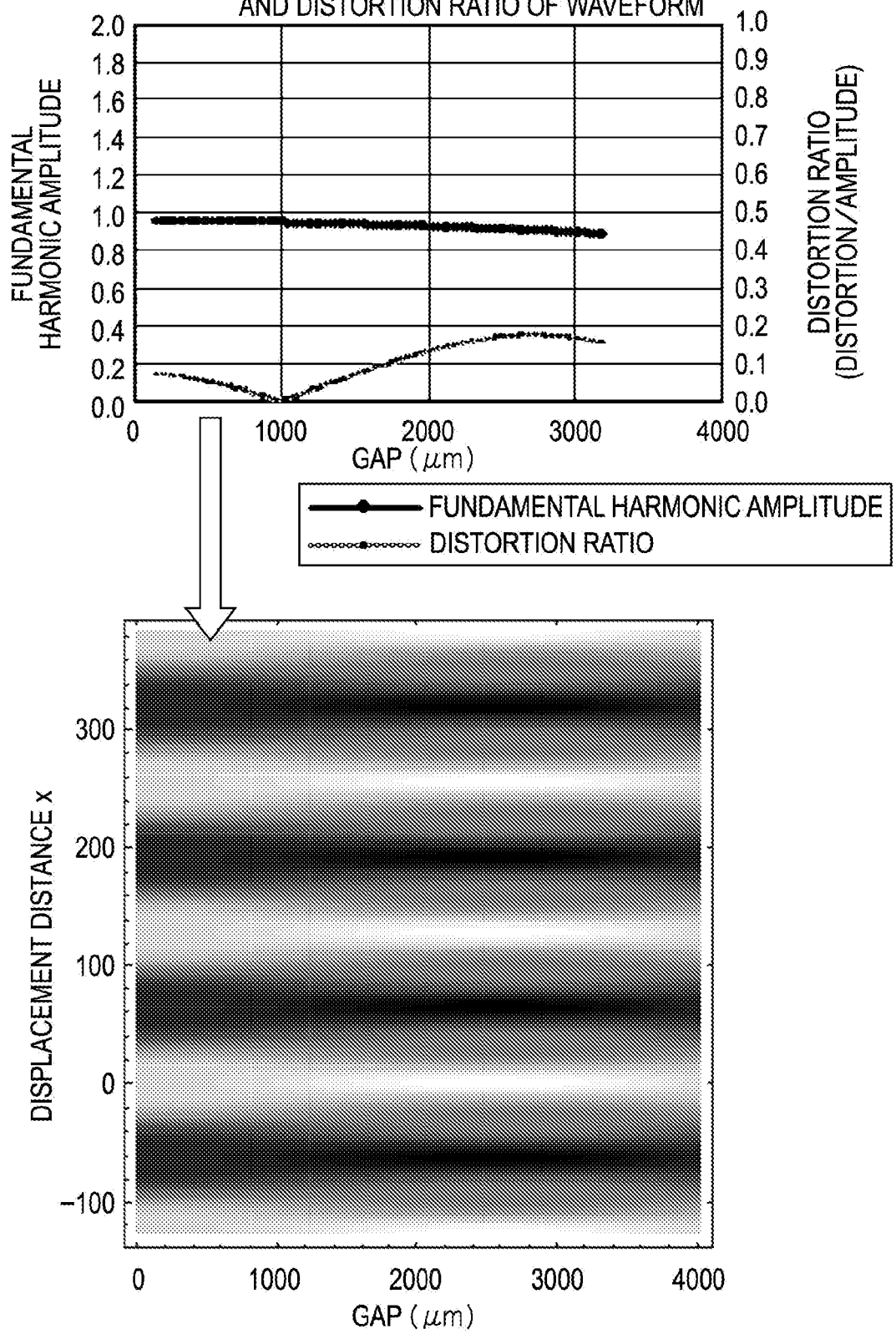
Figure 9C:
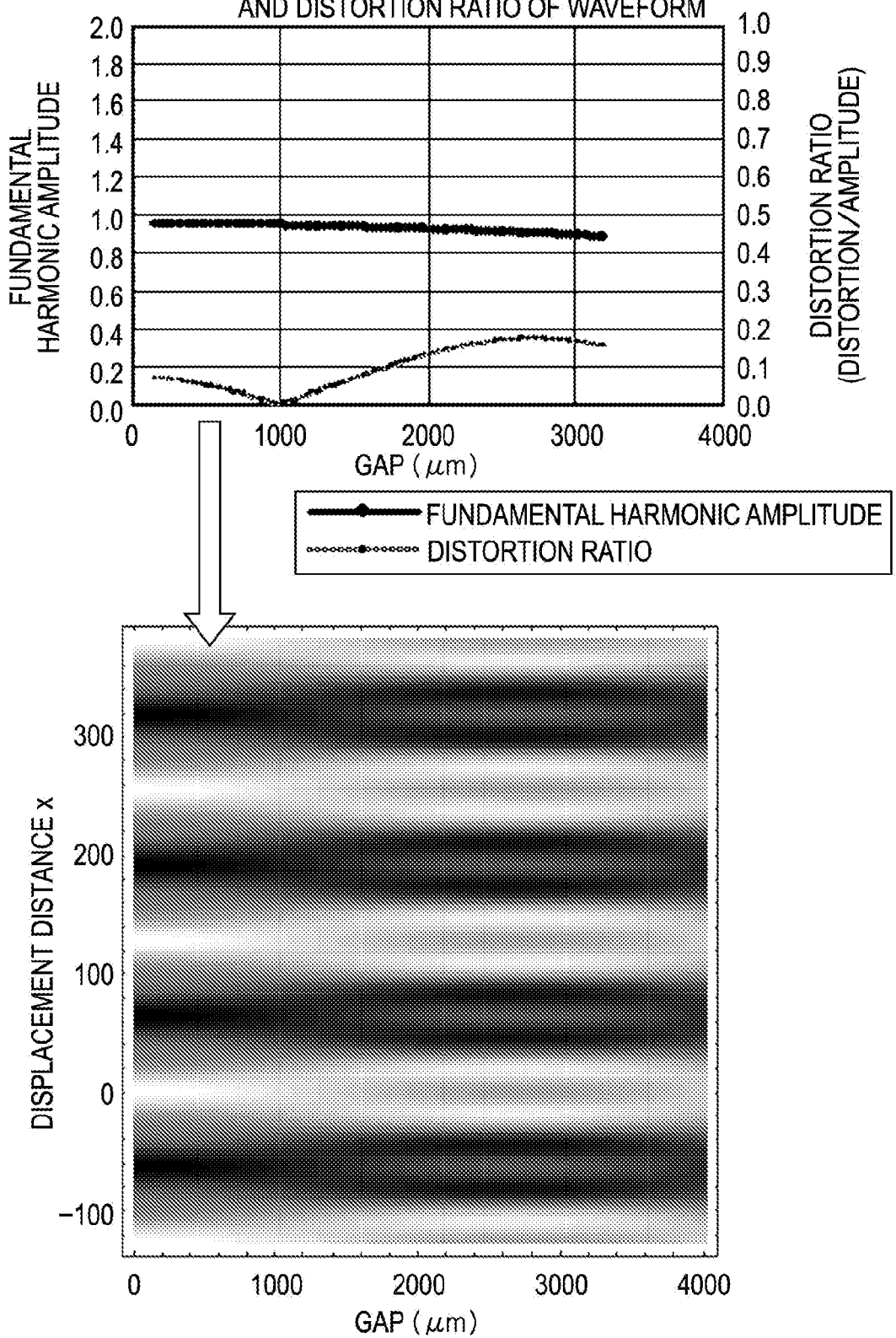

When comparing the two points and determining the amplitude of the fundamental harmonic to be a second selection reference, the amplitude of the fundamental harmonic at the position of the aperture ratio of 78% is larger than that at the position of the aperture ratio of 44%. In this case, it is useful that the aperture ratio of 78% is selected. From the graph shown in FIG. 9A, the optical effective aperture ratio AR that minimizes the distortion is determined to be 78%. Like the upper graph in FIG. 8B, the upper graph in FIG. 9B illustrates the gap characteristic curve when the aperture ratio is 44%, while the upper portion of FIG. 9C illustrates the gap characteristic curve when the aperture ration is 78%.

As can be seen from this upper graph, the 3rd-order component is attenuated and has a minimal value at a gap of 1000 μm. The lower graph in FIG. 9B illustrates the intensity distribution density map. In this map, the abscissa represents the gap and the ordinate represents the displacement direction x.

The white portions indicate the areas having a high light intensity. At the gap position at which the gap is 1000 μm and the distortion becomes minimal, the spatial frequencies of the 3rd-order component cannot be found. In addition, as can be easily seen from the density diagram, if the gap size decreases, the waves obviously become trapezoid waves. In contrast, if the gap size increases, the waves become triangular waves.

Application 3

The case where the pitch P of the main scale 110 is set to 40 μm is described next.

In general, for such a small pitch, the main scale 110 is disposed at the gap position where the contrast of the interference fringes exhibits a peak value (a peak value of the fundamental harmonic).

In an optical system according to the present exemplary embodiment, the scale is illuminated with parallel light beams. Accordingly, the position at which the Fourier image based on the parallel beam illumination system is formed is determined by using the following equation:

$$Z_n = nP^2/\lambda (n=1, 2, 3, \ldots) \qquad (26)$$

where $\lambda$ represents the light source wavelength and P represents the scale pitch.

Here, $Z_n$ indicates the position at which the Fourier image is formed and also indicates the variable period of the contrast of a periodically varying fundamental harmonic. "n" represents a natural number, which corresponds to a Fourier image number discretely formed with respect to the gap.

Figure 10A:
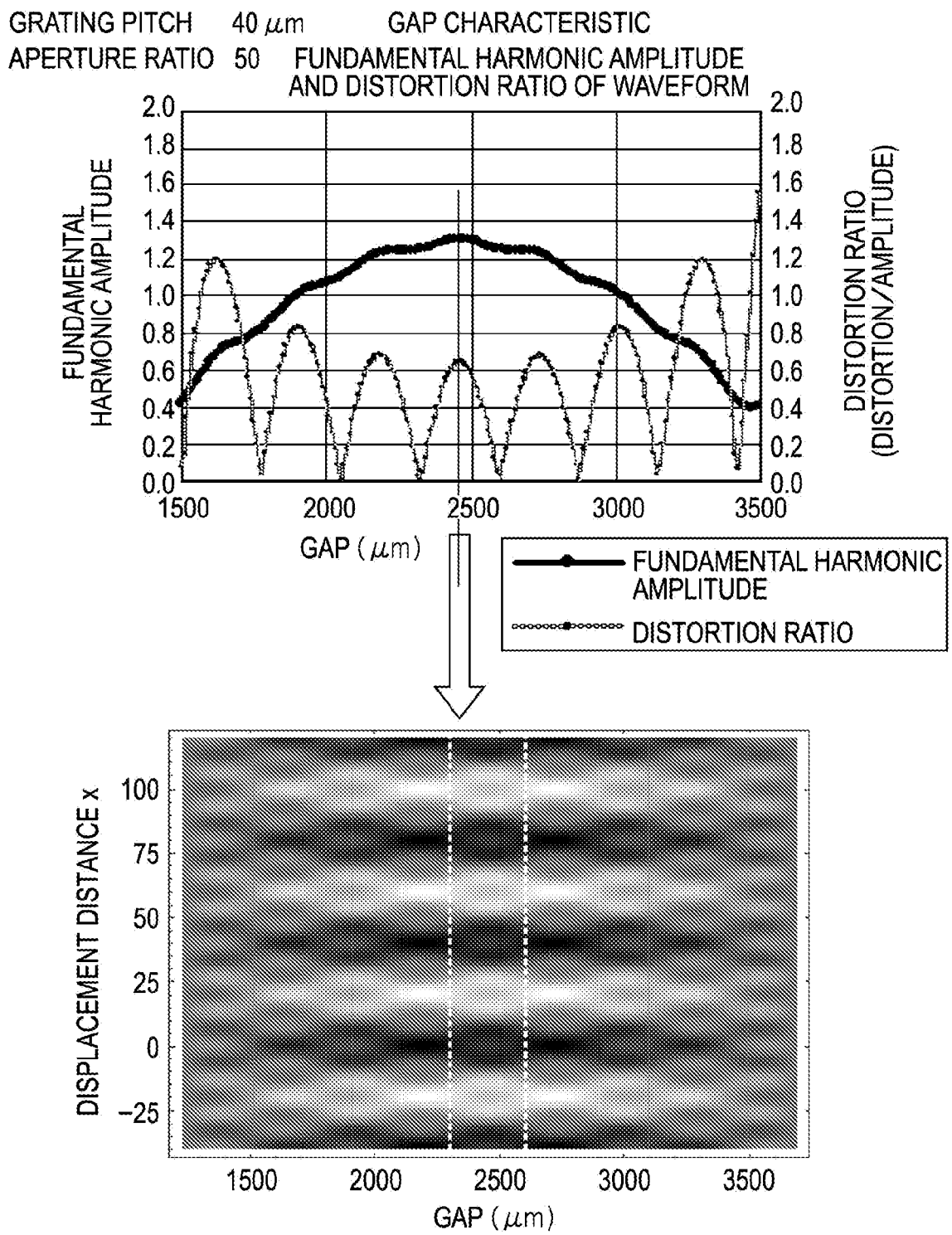
FIGS. 10A and 10B are graphs illustrating an application 3 of the first exemplary embodiment.
Figure 10B:
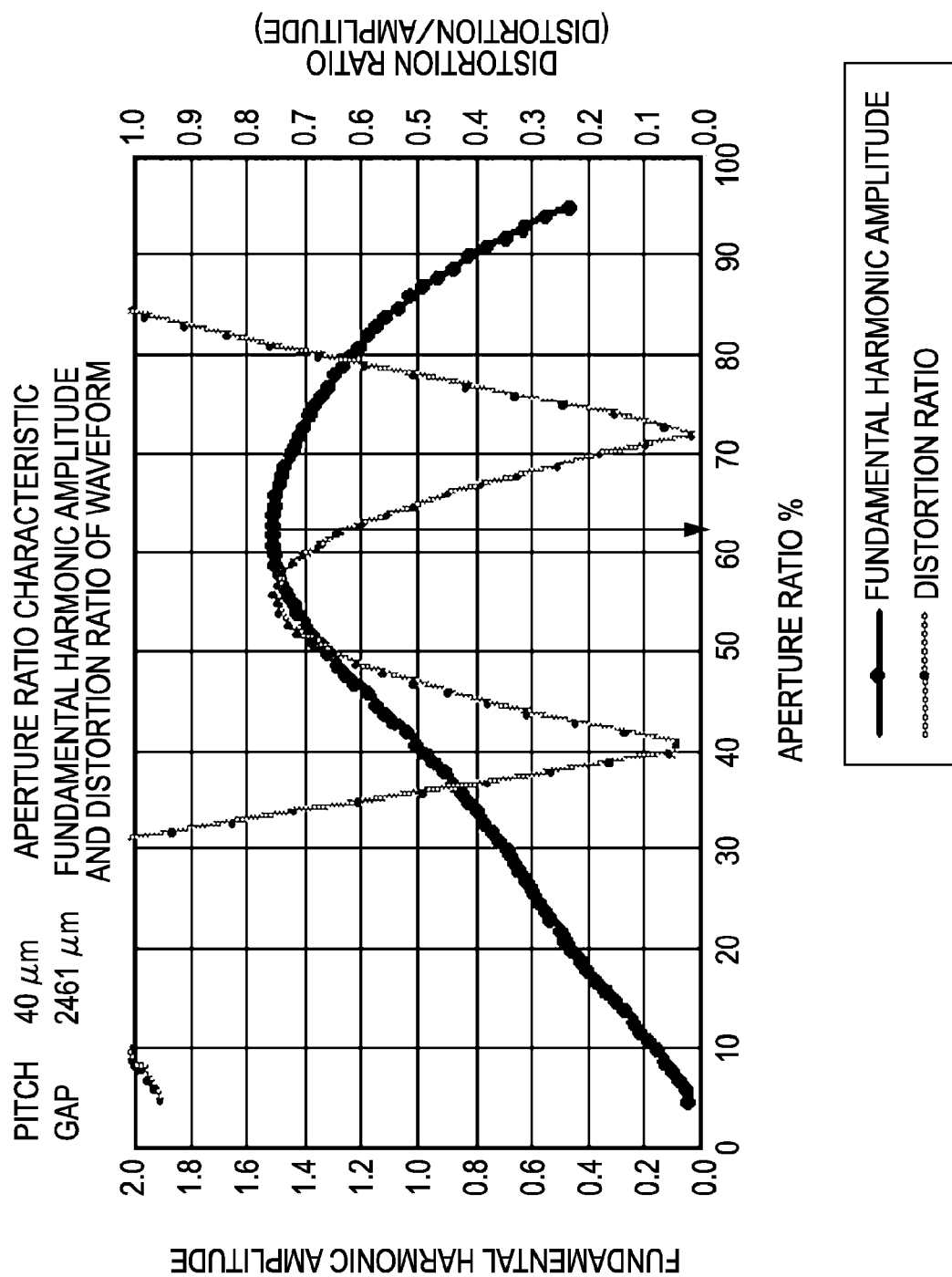

Here, the case where a gap is set at a position of a first Fourier image is discussed. Hereinafter, the image characteristic of the first Fourier image is referred to as a "1st.Peak characteristic." Here, P=40 μm, $\lambda$=0.65 μm, and n=1, and therefore, the gap position $z_1 \cong 2461$ μm. FIGS. 10A and 10B are diagrams illustrating the case where the elimination of the waveform distortion according to at least one exemplary embodiment of the present invention is not carried out. In general, the aperture ratio of the square wave amplitude grating is set to 50%. FIGS. 10A and 10B illustrate the result of the evaluation of the occurrence of 3rd harmonic distortion according to equation (25) of at least one exemplary embodiment of the present invention.

The graph in FIG. 10A illustrates the gap characteristic curve. In this graph, the abscissa represents the gap and the ordinate represents the amplitude of the fundamental harmonic and the distortion ratio.

In this characteristic curve, at the gap position $z_1$ at which the Fourier image is formed and $z_1 \cong 2461$ μm, the peak position of the fundamental harmonic coincides with a peak position of the periodically varying distortion characteristic (the position at which the distortion becomes large). Accordingly, this gap position is not ideal in terms of the waveform distortion.

Additionally, when the aperture ratio is determined on the basis of the maximum amplitude of the fundamental harmonic, the aperture ratio of 64.5% is selected from the graph shown in FIG. 10B. Even at this gap point, the value of the 3rd harmonic distortion is high.

In such a case, by carrying out the aperture ratio setting of a grating on the main scale according to at least one exemplary embodiment of the present invention, the minimal point of the harmonic distortion can be set to the desired gap position (the gap position at which the Fourier image is formed in this case).

More details are described below with reference to FIGS. 11A-C.

According to equation (25) of at least one exemplary embodiment of the present invention, the minimal values appear at positions at which the optical effective aperture ratio AR=40.55% and 72.2%.

When comparing these two positions, like the above-described case, the amplitude of the fundamental harmonic is determined to be a second selection reference.

The amplitude of the fundamental harmonic when the aperture ratio is 72.2% is larger than that when the aperture ratio is 40.55%. In this case, it is useful that the aperture ratio of 72.2% is selected for the main scale 110.

While, in this example, the description has been made with reference to the main scale 110 having a pitch of 40 μm, the same result can be obtained at the gap point at which the Fourier image is formed, regardless of the value of the pitch.

FIGS. 12A-C illustrate the gap characteristic curves in which the relationship of equation (26) is applied to equation (25) and the gap size is normalized with respect to the fundamental period $z_1$, which is the period of the occurrence of the Fourier image.

FIGS. 12A-C illustrate the gap characteristic curves for the scale pitch of 20 μm, 200 μm, and 2000 μm, respectively.

As described above, the distortion is minimized at a position at which the Fourier image is formed, that is, at the position indicated by a value of 1 on the abscissa. When the gap size is normalized with respect to $z_1$, which is the period of the occurrence of the Fourier image, the curves exhibit the same characteristics.

Therefore, at least one exemplary embodiment of the present invention provides the following information. Let P denote the scale pitch of the main scale and λ denote the light source wavelength. When the main scale is illuminated with parallel light beams emitted from the light source via a collimator lens, the gap that generates the Fourier image is represented by equation (26). When this gap setting is applied, the 3rd-order harmonic distortion can be minimized by using the aperture ratios of 40.55% and 72.2%.

So far, the three specific applications according to at least one exemplary embodiment of the present invention have been described. The key point is that, in all the applications, the above-described relationship is satisfied by applying equations (11) and (12), which are relational expressions relating to the aperture ratios of the diffracted light contained in equation (25) and the diffraction efficiency.

That is, it is assumed that an ideal square wave amplitude grating is employed. However, in practice, if the diffraction efficiency of the main scale is different, the aperture ratios that minimize the 3rd-order harmonic distortion are different from the values indicated in the above-described applications 1 to 3. Examples of a scale used with a square wave amplitude grating include a photoengraving film scale, a metallic etching scale, and a scale produced by coating a metal evaporated film on a glass surface and providing a grating in the metal evaporated film by means of etching. In addition, the relationship between the aperture ratio and the diffraction efficiency is not always equal to that indicated by equations (11) and (12) due to, for example, the precision of manufacturing of the scale and the linearity of the grating edge.

Thus, the diffraction efficiency of the actual square wave amplitude grating depends on the material of the scale, the method of manufacturing of the scale, and the precision of manufacturing of the scale.

Accordingly, when applying at least one exemplary embodiment of the present invention to the actual square wave amplitude grating, the diffraction efficiency of an actually used scale is measured first. Thereafter, the measured value is corrected with respect to equations (11) and (12). Thus, the exact aperture ratio that can accurately eliminate or reduce the harmonic distortion component can be determined.

When the pitch of the main scale is relatively coarse, high-order diffracted waves are included in the effective optical path, and therefore, the waveform distortion is noticeable. For example, the case where the pitch is greater than or equal to 100 μm is discussed.

When the light source wavelength λ is about 0.65 μm, the position at which the Fourier image is formed is greater than or equal to 15 mm. In practice, such a gap size is not employed. In several cases, in order to efficiently use the space, the gap is determined to be less than or equal to about 1 mm. In this case, when a signal is electrically divided using a main scale having such a coarse pitch, the waveform distortion that overlaps the displacement signal is problematic.

As described in Applications 1 and 2 in which the pitch is 128 μm, by appropriately setting the aperture ratio that minimizes the distortion using a desired gap, the harmonic distortion occurring when the coarse pitch is employed can be eliminated or reduced.

Second Exemplary Embodiment

The case where divergent light beams are emitted to the main scale is described next.

In the first exemplary embodiment, equation (25) is derived in terms of a diffraction image when parallel beams are emitted to the main scale. In a second exemplary embodiment, the case where divergent light beams are emitted to the main scale is discussed.

Figure 13:
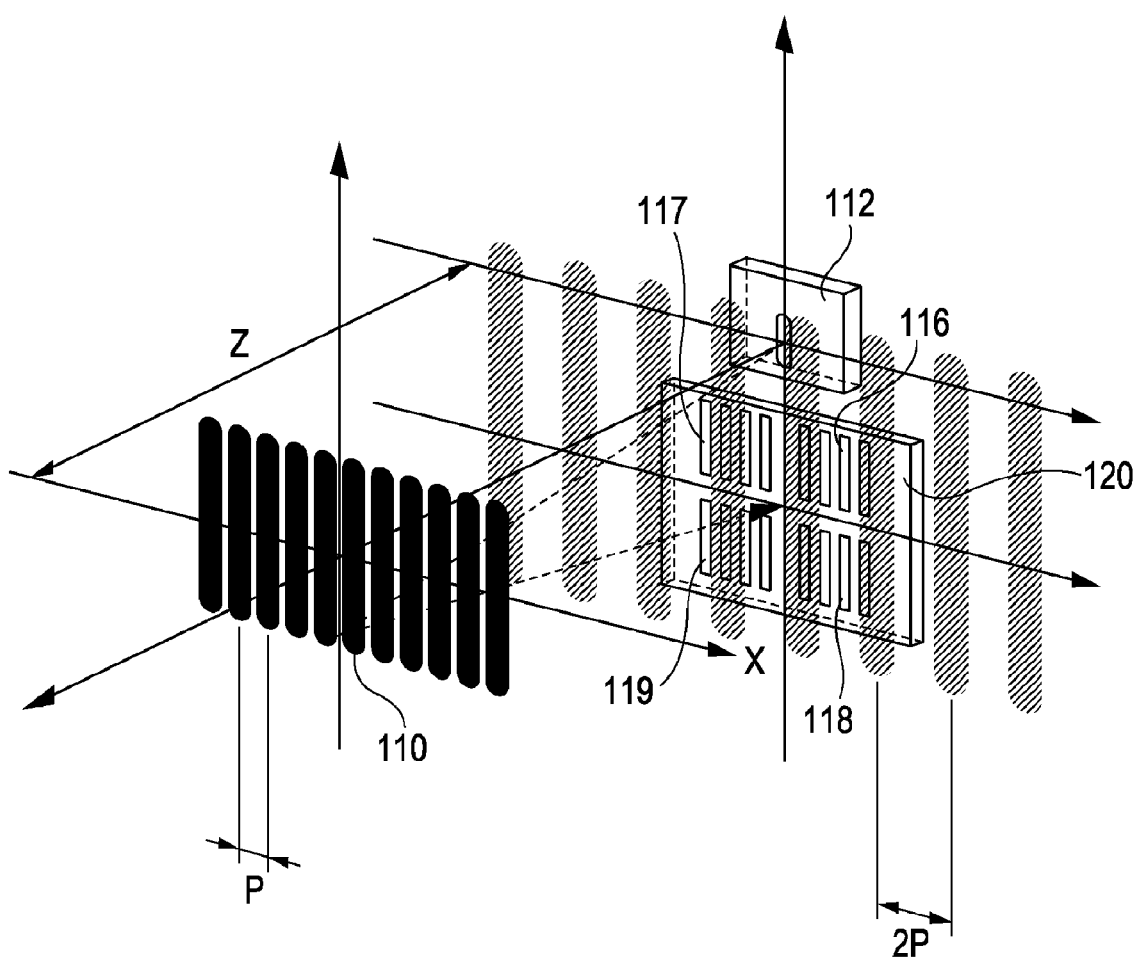
FIG. 13 illustrates the structure of a reflective encoder according to a second exemplary embodiment of the present invention.

FIG. 13 illustrates the structure of a reflective encoder.

The main scale 110 is illuminated with divergent light beams from the light source 112. The reflected diffracted light from the main scale 110 forms interference fringes on an index scale 120.

The index scale 120 and the main scale 110 are disposed with a gap Z therebetween. According to this structure, on a surface of the index scale 120, interference fringes having a period twice the period of a pitch P of the main scale 110 are formed. The other structures are similar to those of the first exemplary embodiment. Accordingly, descriptions thereof are not repeated.

Figure 14:
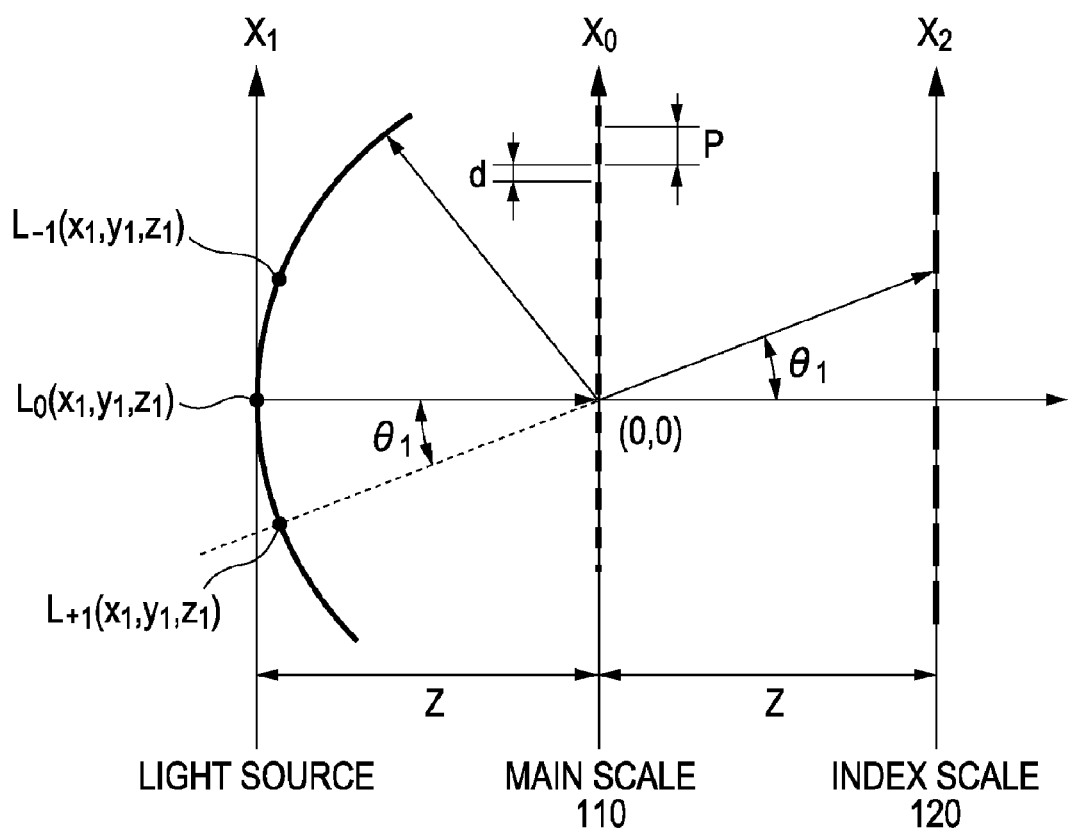
FIG. 14 illustrates an equivalent optical model of the divergent light beam system according to the second exemplary embodiment of the present invention.

At least one exemplary embodiment of the present invention can be applied to an encoder having such a structure. FIG. 14 illustrates an equivalent optical system of the structure shown in FIG. 13.

In FIG. 14, the main scale 110 is disposed at the center and moves along a moving directional axis X0. The index scale 120 is disposed on an axis X2. A light source is disposed on an axis X1 at coordinates L0.

The distance between X0 and X2 and the distance between X0 and X1 shown in FIG. 14 correspond to the gap Z between the main scale and the index scale shown in FIG. 13.

The divergent light beams are emitted from the position indicated by the coordinates L0 of the light source onto the main scale 110 disposed on the axis X0. The light beams are diffracted by the surface of the diffraction grating and a light ray diagram is shown in FIG. 14.

The light beam emitted from the coordinates L0 enters the origin (0, 0) on the main scale 110. Thereafter, the light beam is diffracted at a diffraction angle θ1 and reaches the index scale 120.

The direction (line) of the diffracted light beam is extended towards the direction opposite to the light traveling direction. Let $L_{+1}$ denote a point at which that line intersects a circle whose center is the origin (0, 0) and whose radius is Z. Then, the diffracted light forms a wave plane as if the diffracted light were light waves emitted from a light source disposed at the point $L_{+1}$.

Accordingly, the interference image can be considered to be formed of overlapping divergent light beams emitted from these virtual light sources $L_{+1}, L_{-1}, \ldots$ that correspond to diffracted light beams having individual diffraction orders. Thus, the interference image can be computed.

By considering that the emission intensity of the virtual light source is based on the diffraction efficiency described in the first exemplary embodiment, the light intensity distribution of the interference fringes caused by the overlap of diffraction light beams on the main scale 110 can be computed, as in the first exemplary embodiment.

Although, in the first exemplary embodiment, plane waves are overlapped, divergent light beams are overlapped in this exemplary embodiment. Like the above-described calculation, the number of the wave planes is only the number of target diffracted light beams. Therefore, the light intensity distribution of the interference fringes on the index scale 120 can be computed in a simple manner, as in the first exemplary embodiment.

The result of the calculation is shown below, although the calculation process is not shown.

The light waves of individual diffraction orders are expressed by the following equations. The intensity of each of the diffracted waves is computed by using equations (11) and (12). Each of the diffracted waves is considered to be a spherical wave and is represented in the form of a complex number.

However, in the following equations, the term (1/z) that is inversely proportional to the distance by which the light wave is attenuated before the light wave reaches the observation point is neglected. As in the first exemplary embodiment, d denotes the aperture width, P denotes the main scale pitch, λ denotes the light source wavelength, z denotes the gap direction, and x denotes the scale displacement direction. Here, it is assumed that the grating extends to infinity in the y direction and its effect is neglected. Let U0, U1p, U1m, U2p, U2m, U3p, and U3m denote seven spherical wave amplitudes of the 0th- and ±1st- to 3rd-diffracted light, respectively. Then, the amplitudes of the diffracted light beams are expressed by the following equations (27) to (33):

0th-order diffracted light amplitude $U0$ (27)

$$u0 = \left(\frac{d}{p}\right) \text{Exp}\left[i\left(\frac{2\pi}{\lambda}\sqrt{x^2 + (2z)^2}\right)\right]$$

+1st-order diffracted light amplitude $U1p$ (28)

$$u1p = \frac{\text{Sin}\left[\frac{d\pi}{p}\right]}{\pi} \text{Exp}\left[i\left(\frac{2\pi}{\lambda}\sqrt{\left(x-\left(\frac{\lambda}{p}z\right)\right)^2 + \left(z\left(1+\sqrt{1-\left(\frac{\lambda}{p}\right)^2}\right)\right)^2}\right)\right]$$

−1st-order diffracted light amplitude $U1m$ (29)

$$u1m = \frac{\text{Sin}\left[\frac{d\pi}{p}\right]}{\pi} \text{Exp}\left[i\left(\frac{2\pi}{\lambda}\sqrt{\left(x+\left(\frac{\lambda}{p}z\right)\right)^2 + \left(z\left(1+\sqrt{1-\left(\frac{\lambda}{p}\right)^2}\right)\right)^2}\right)\right]$$

+2nd-order diffracted light amplitude $U2p$ (30)

$$u2p = \frac{\text{Sin}\left[\frac{2d\pi}{p}\right]}{2\pi} \text{Exp}\left[i\left(\frac{2\pi}{\lambda}\sqrt{\left(x-\left(\frac{2\lambda}{p}z\right)\right)^2 + \left(z\left(1+\sqrt{1-\left(\frac{2\lambda}{p}\right)^2}\right)\right)^2}\right)\right]$$

−2nd-order diffracted light amplitude $U2m$ (31)

$$u2m = \frac{\text{Sin}\left[\frac{2d\pi}{p}\right]}{2\pi} \text{Exp}\left[i\left(\frac{2\pi}{\lambda}\sqrt{\left(x+\left(\frac{2\lambda}{p}z\right)\right)^2 + \left(z\left(1+\sqrt{1-\left(\frac{2\lambda}{p}\right)^2}\right)\right)^2}\right)\right]$$

+3rd-order diffracted light amplitude $U3p$ (32)

$$u3p = \frac{\text{Sin}\left[\frac{3d\pi}{p}\right]}{3\pi} \text{Exp}\left[i\left(\frac{2\pi}{\lambda}\sqrt{\left(x-\left(\frac{3\lambda}{p}z\right)\right)^2 + \left(z\left(1+\sqrt{1-\left(\frac{3\lambda}{p}\right)^2}\right)\right)^2}\right)\right]$$

−3rd-order diffracted light amplitude $U3m$ (33)

$$u3m = \frac{\text{Sin}\left[\frac{3d\pi}{p}\right]}{3\pi} \text{Exp}\left[i\left(\frac{2\pi}{\lambda}\sqrt{\left(x+\left(\frac{3\lambda}{p}z\right)\right)^2 + \left(z\left(1+\sqrt{1-\left(\frac{3\lambda}{p}\right)^2}\right)\right)^2}\right)\right]$$

Subsequently, the combined amplitude of seven waves of the 0th- and ±1st- to 3rd-order diffracted light (i.e., the sum of these seven waves) is computed. The resulting value is then multiplied by the complex conjugate number to obtain the combined intensity.

Let UU0, UU1p, UU1m, UU2p, UU2m, UU3p, and UU3m denote the corresponding complex conjugate numbers. Then, the combined waves f1 and f2 are expressed as follows:

$$f1 = u0 + u1p + u1m + u2p + u2m + u3p + u3m \quad (34)$$

$$f2 = uu0 + uu1p + uu1m + uu2p + uu2m + uu3p + uu3m \quad (35)$$

The interference image arising from the diffraction grating on the main scale can be obtained by multiplying the sum of the complex amplitudes f1 by its complex conjugate number f2. That is, by substituting AR with d/p (AR=d/p), the combined intensity I(x, z, AR, λ) is rewritten as follows:

$$I(x, z, d, p, \lambda) = f1 \times f2 \tag{36}$$

The result of this equation is expressed as follows:

$$
\begin{aligned}
I[x, z, d, p, \lambda] = &\frac{d^2}{p^2} + \frac{2d\cos\left[\frac{2\pi\sqrt{x^2+4n^2}}{\lambda} - \frac{2\pi\sqrt{\left(x-\frac{\pi\lambda}{P}\right)^2 + n^2\left(1+\sqrt{1-\frac{\lambda^2}{p^2}}\right)^2}}{\lambda}\right]\sin\left[\frac{d\pi}{p}\right]}{p\pi} + \\
&\frac{2d\cos\left[\frac{2\pi\sqrt{\pi^2/4n^2}}{\lambda} - \frac{2\pi\sqrt{\left(x+\frac{\pi\lambda}{P}\right)^2 + \pi^2\left(1+\sqrt{1-\frac{\lambda^2}{p^2}}\right)^2}}{\lambda}\right]\sin\left[\frac{d\pi}{P}\right]}{p\pi} + \frac{2\sin\left[\frac{d\pi}{P}\right]^2}{\pi^2} + \\
&\frac{2\cos\left[\frac{2\pi\sqrt{\left(x-\frac{\pi\lambda}{P}\right)^2 + n^2\left(1+\sqrt{1-\frac{\lambda^2}{p^2}}\right)^2}}{\lambda} - \frac{2\pi\sqrt{\left(x+\frac{\pi\lambda}{P}\right)^2 \cdot n^2\left(1+\sqrt{1-\frac{\lambda^2}{p^2}}\right)^2}}{\lambda}\right]\sin\left[\frac{d\pi}{P}\right]^2}{\pi^2} + \\
&\frac{d\cos\left[\frac{2\pi\sqrt{x^2+4n^2}}{\lambda} - \frac{2\pi\sqrt{\left(x-\frac{2\pi\lambda}{P}\right)^2 + n^2\left(1+\sqrt{1-\frac{4\lambda^2}{p^2}}\right)^2}}{\lambda}\right]\sin\left[\frac{2d\pi}{P}\right]}{p\pi} + \\
&\frac{d\cos\left[\frac{2\pi\sqrt{x^2+4n^2}}{\lambda} - \frac{2\pi\sqrt{\left(x+\frac{2\pi\lambda}{P}\right)^2 + n^2\left(1+\sqrt{1-\frac{4\lambda^2}{p^2}}\right)^2}}{\lambda}\right]\sin\left[\frac{2d\pi}{P}\right]}{p\pi} + \\
&\frac{\cos\left[\frac{2\pi\sqrt{\left(x+\frac{2\pi\lambda}{P}\right)^2 + n^{23}\left(1+\sqrt{1-\frac{4\pi^2}{p^2}}\right)^2}}{\lambda} - \frac{2\pi\sqrt{\left(x-\frac{\pi\lambda}{P}\right)^2 + n^2\left(1+\sqrt{1-\frac{\lambda^2}{p^2}}\right)^2}}{\lambda}\right]\sin\left[\frac{4\pi}{P}\right]\sin\left[\frac{2d\pi}{P}\right]}{\pi^2} + \\
&\frac{\cos\left[\frac{2\pi\sqrt{\left(x+\frac{2\pi\lambda}{P}\right)^2 + n^2\left(1+\sqrt{1-\frac{4\lambda^2}{P^2}}\right)^2}}{\lambda} - \frac{2\pi\sqrt{\left(x-\frac{\pi\lambda}{P}\right)^2 + n^2\left(1+\sqrt{1-\frac{\lambda^2}{P^2}}\right)^2}}{\lambda}\right]\sin\left[\frac{4\pi}{P}\right]\sin\left[\frac{2d\pi}{P}\right]}{\pi^2} + \\
&\frac{\cos\left[\frac{2\pi\sqrt{\left(x-\frac{2\pi\lambda}{P}\right)^2 + n^2\left(1+\sqrt{1-\frac{4\lambda^2}{P^2}}\right)^2}}{\lambda} - \frac{2\pi\sqrt{\left(x+\frac{\pi\lambda}{P}\right)^2 + n^2\left(1+\sqrt{1-\frac{\lambda^2}{p^2}}\right)^2}}{\lambda}\right]\sin\left[\frac{d\pi}{P}\right]\sin\left[\frac{2d\pi}{P}\right]}{\pi^2} + \\
&\frac{\cos\left[\frac{2\pi\sqrt{\left(x-\frac{2\pi\lambda}{P}\right)^2 + n^2\left(1+\sqrt{1-\frac{4\lambda^2}{P^2}}\right)^2}}{\lambda} - \frac{2\pi\sqrt{\left(x+\frac{\pi\lambda}{P}\right)^2 + n^2\left(1+\sqrt{1-\frac{\lambda^2}{P^2}}\right)^2}}{\lambda}\right]\sin\left[\frac{d\pi}{P}\right]\sin\left[\frac{2d\pi}{P}\right]}{\pi^2} + \\
&\frac{\sin\left[\frac{2d\pi}{P}\right]^2}{2\pi^2} + \frac{\cos\left[\frac{2\pi\sqrt{\left(x-\frac{2\pi\lambda}{P}\right)^2 + n^2\left(1+\sqrt{1-\frac{4\lambda^2}{P^2}}\right)^2}}{\lambda} - \frac{2\pi\sqrt{\left(x-\frac{2\pi\lambda}{P}\right)^2 + n^2\left(1+\sqrt{1-\frac{4\lambda^2}{P^2}}\right)^2}}{\lambda}\right]\sin\left[\frac{2d\pi}{P}\right]^2}{2\pi^2} +
\end{aligned}
\tag{37}
$$

-continued $$\frac{2d\mathrm{Cos}\left[\frac{2\pi\sqrt{n^2+4\pi^2}}{\lambda}-\frac{2\pi\sqrt{\left(x+\frac{3\pi\lambda}{p}\right)^2+n^2\left(1+\sqrt{1-\frac{9\lambda^2}{p^2}}\right)^2}}{\lambda}\right]\mathrm{Sin}\left[\frac{3d\pi}{P}\right]}{3p\pi}+$$

$$\frac{2d\mathrm{Cos}\left[\frac{2\pi\sqrt{x^2+4\pi^2}}{\lambda}-\frac{2\pi\sqrt{\left(x+\frac{3\pi\lambda}{P}\right)^2+n^2\left(1+\sqrt{1-\frac{9\lambda^2}{p^2}}\right)^2}}{\lambda}\right]\mathrm{Sin}\left[\frac{3d\pi}{P}\right]}{3p\pi}+$$

$$\frac{2\mathrm{Cos}\left[\frac{2\pi\sqrt{\left(x-\frac{3\pi\lambda}{P}\right)^2+n^2\left(1+\sqrt{1-\frac{9\lambda^2}{P^2}}\right)^2}}{\lambda}-\frac{2\pi\sqrt{\left(x-\frac{\pi\lambda}{P}\right)^2+n^2\left(1+\sqrt{1-\frac{\lambda^2}{p^2}}\right)^2}}{\lambda}\right]\mathrm{Sin}\left[\frac{4\pi}{P}\right]\mathrm{Sin}\left[\frac{3d\pi}{P}\right]}{3\pi^2}+$$

$$\frac{2\mathrm{Cos}\left[\frac{2\pi\sqrt{\left(x-\frac{3\pi\lambda}{P}\right)^2+n^2\left(1+\sqrt{1-\frac{9\lambda^2}{P^2}}\right)^2}}{\lambda}-\frac{2\pi\sqrt{\left(x-\frac{\pi\lambda}{P}\right)^2+n^2\left(1+\sqrt{1-\frac{\lambda^2}{p^2}}\right)^2}}{\lambda}\right]\mathrm{Sin}\left[\frac{4\pi}{P}\right]\mathrm{Sin}\left[\frac{3d\pi}{P}\right]}{3\pi^2}+$$

$$\frac{2\mathrm{Cos}\left[\frac{2\pi\sqrt{\left(x-\frac{3\pi\lambda}{P}\right)^2+n^2\left(1+\sqrt{1-\frac{9\lambda^2}{P^2}}\right)^2}}{\lambda}-\frac{2\pi\sqrt{\left(x-\frac{\pi\lambda}{P}\right)^2+n^2\left(1+\sqrt{1-\frac{\lambda^2}{p^2}}\right)^2}}{\lambda}\right]\mathrm{Sin}\left[\frac{4\pi}{P}\right]\mathrm{Sin}\left[\frac{3d\pi}{P}\right]}{3\pi^2}+$$

$$\frac{2\mathrm{Cos}\left[\frac{2\pi\sqrt{\left(x-\frac{3\pi\lambda}{P}\right)^2+n^2\left(1+\sqrt{1-\frac{9\lambda^2}{P^2}}\right)^2}}{\lambda}-\frac{2\pi\sqrt{\left(x-\frac{\pi\lambda}{P}\right)^2+n^2\left(1+\sqrt{1-\frac{\lambda^2}{p^2}}\right)^2}}{\lambda}\right]\mathrm{Sin}\left[\frac{4\pi}{P}\right]\mathrm{Sin}\left[\frac{3d\pi}{P}\right]}{3\pi^2}+$$

$$\frac{\mathrm{Cos}\left[\frac{2\pi\sqrt{\left(x-\frac{3\pi\lambda}{P}\right)^2+n^2\left(1+\sqrt{1-\frac{9\lambda^2}{P^2}}\right)^2}}{\lambda}-\frac{2\pi\sqrt{\left(x-\frac{2\pi\lambda}{P}\right)^2+n^2\left(1+\sqrt{1-\frac{4\lambda^2}{P^2}}\right)^2}}{\lambda}\right]\mathrm{Sin}\left[\frac{2d\pi}{P}\right]\mathrm{Sin}\left[\frac{3d\pi}{P}\right]}{3\pi^2}+$$

$$\frac{\mathrm{Cos}\left[\frac{2\pi\sqrt{\left(x-\frac{3\pi\lambda}{P}\right)^2+n^2\left(1+\sqrt{1-\frac{9\lambda^2}{P^2}}\right)^2}}{\lambda}-\frac{2\pi\sqrt{\left(x-\frac{2\pi\lambda}{P}\right)^2+n^2\left(1+\sqrt{1-\frac{4\lambda^2}{P^2}}\right)^2}}{\lambda}\right]\mathrm{Sin}\left[\frac{2d\pi}{P}\right]\mathrm{Sin}\left[\frac{3d\pi}{P}\right]}{3\pi^2}+$$

$$\frac{\mathrm{Cos}\left[\frac{2\pi\sqrt{\left(x-\frac{3\pi\lambda}{P}\right)^2+n^2\left(1+\sqrt{1-\frac{9\lambda^2}{P^2}}\right)^2}}{\lambda}-\frac{2\pi\sqrt{\left(x-\frac{2\pi\lambda}{P}\right)^2+n^2\left(1+\sqrt{1-\frac{4\lambda^2}{P^2}}\right)^2}}{\lambda}\right]\mathrm{Sin}\left[\frac{2d\pi}{P}\right]\mathrm{Sin}\left[\frac{3d\pi}{P}\right]}{3\pi^2}+$$

$$\frac{\mathrm{Cos}\left[\frac{2\pi\sqrt{\left(x-\frac{3\pi\lambda}{P}\right)^2+n^2\left(1+\sqrt{1-\frac{9\lambda^2}{P^2}}\right)^2}}{\lambda}-\frac{2\pi\sqrt{\left(x-\frac{2\pi\lambda}{P}\right)^2+n^2\left(1+\sqrt{1-\frac{4\lambda^2}{P^2}}\right)^2}}{\lambda}\right]\mathrm{Sin}\left[\frac{2d\pi}{P}\right]\mathrm{Sin}\left[\frac{3d\pi}{P}\right]}{3\pi^2}+$$

-continued $$\frac{2\mathrm{Sin}\left[\frac{3d\pi}{P}\right]^2}{9\pi^2} + \frac{2\mathrm{Cos}\left[\frac{2\pi\sqrt{\left(x-\frac{3\pi\lambda}{P}\right)^2+n^2\left(1+\sqrt{1-\frac{9\lambda^2}{P^2}}\right)^2}}{\lambda} - \frac{2\pi\sqrt{\left(x-\frac{\pi\lambda}{P}\right)^2+n^2\left(1+\sqrt{1-\frac{\lambda^2}{p^2}}\right)^2}}{\lambda}\right]\mathrm{Sin}\left[\frac{3d\pi}{P}\right]^2}{9\pi^2}$$

As in the first exemplary embodiment, only the combinations of the diffracted light beams that contribute to the 3rd-order harmonic distortion are computed as follows:
f3=u0*uu1p+u0*uu1m+uu0*u1p+uu0*u1m+u0*uu3p+ u0*uu3m+uu0*u3p+uu0*u3m+uu1p*u2m+uu1m*u2p+ u1p*uu2m+u1m*uu2p Finally, the intensity distribution of the diffraction image on the main scale 110 illuminated with the divergent light beams (the intensity distribution of only components that effect the 3rd-order harmonic component) is expressed as follows:

As in the first exemplary embodiment, in general, for such a small pitch, the main scale 110 is disposed at the gap position where the contrast of the interference fringes exhibit a peak value (a peak value of the fundamental harmonic).

Unlike the first exemplary embodiment, in an optical system according to the second exemplary embodiment, the main scale 110 is illuminated with divergent light. Accordingly, the position at which the Fourier image based on the divergent light beam illumination system is formed is determined by using the following equation:

$$I[x, z, d, p, \lambda] = \frac{2d\mathrm{Cos}\left[\frac{2\pi\sqrt{x^2+4z^2}}{\lambda} - \frac{2\pi\sqrt{\left(x-\frac{z\lambda}{p}\right)^2+z^2\left(1+\sqrt{1-\frac{\lambda^2}{p^2}}\right)^2}}{\lambda}\right]\mathrm{Sin}\left[\frac{d\pi}{p}\right]}{p\pi} + $$

$$\frac{2d\mathrm{Cos}\left[\frac{2\pi\sqrt{x^2+4z^2}}{\lambda} - \frac{2\pi\sqrt{\left(x-\frac{z\lambda}{p}\right)^2+z^2\left(1+\sqrt{1-\frac{\lambda^2}{p^2}}\right)^2}}{\lambda}\right]\mathrm{Sin}\left[\frac{d\pi}{p}\right]}{p\pi} + $$

$$\frac{1}{\pi^2}\left(\mathrm{Cos}\left[\frac{2\pi\sqrt{\left(x+\frac{2z\lambda}{p}\right)^2+z^2\left(1+\sqrt{1-\frac{4\lambda^2}{p^2}}\right)^2}}{\lambda} - \frac{2\pi\sqrt{\left(x+\frac{z\lambda}{p}\right)^2+z^2\left(1+\sqrt{1-\frac{\lambda^2}{p^2}}\right)^2}}{\lambda}\right]\mathrm{Sin}\left[\frac{d\pi}{p}\right]\mathrm{Sin}\left[\frac{2d\pi}{p}\right]\right) + $$

$$\frac{1}{\pi^2}\left(\mathrm{Cos}\left[\frac{2\pi\sqrt{\left(x+\frac{2z\lambda}{p}\right)^2+z^2\left(1+\sqrt{1-\frac{4\lambda^2}{p^2}}\right)^2}}{\lambda} - \frac{2\pi\sqrt{\left(x+\frac{z\lambda}{p}\right)^2+z^2\left(1+\sqrt{1-\frac{\lambda^2}{p^2}}\right)^2}}{\lambda}\right]\mathrm{Sin}\left[\frac{d\pi}{p}\right]\mathrm{Sin}\left[\frac{2d\pi}{p}\right]\right) + $$

$$\frac{1}{3p\pi}\left(2d\mathrm{Cos}\left[\frac{2\pi\sqrt{x^2+4z^2}}{\lambda} - \frac{2\pi\sqrt{\left(x+\frac{3z\lambda}{p}\right)^2+z^2\left(1+\sqrt{1-\frac{4\lambda^2}{p^2}}\right)^2}}{\lambda}\right]\mathrm{Sin}\left[\frac{3d\pi}{p}\right]\right) + $$

$$\frac{1}{3p\pi}\left(2d\mathrm{Cos}\left[\frac{2\pi\sqrt{x^2+4z^2}}{\lambda} - \frac{2\pi\sqrt{\left(x+\frac{3z\lambda}{p}\right)^2+z^2\left(1+\sqrt{1-\frac{9\lambda^2}{p^2}}\right)^2}}{\lambda}\right]\mathrm{Sin}\left[\frac{3d\pi}{p}\right]\right)$$

(38)

The effect of the elimination of the 3rd-order harmonic distortion using equation (38) in the reflective encoder is described next in detail with reference to specific applications.

Application 4

In this application, a reflective encoder having a structure according to the second exemplary embodiment includes the main scale 110 having a pitch P of 40 μm. The main scale 110 is illuminated with divergent light.

$$Z_n = 2nP^2/\lambda (n=1, 2, 3, \ldots) \quad (39)$$

where λ represents the wavelength of the light source and P represents the scale pitch.

Here, $Z_n$ indicates the position at which the Fourier image is formed and also indicates the variable period of the contrast of a periodically varying fundamental harmonic. "n" represents a natural number, which corresponds to a Fourier image number discretely formed with respect to the gap.

When compared with the first exemplary embodiment based on the parallel beam illumination system having the pitch P that has the same period of generating the Fourier image, the variation of the contrast occurs in twice the period.

The gap sensitivity of the reflective encoder is lower than that of the encoder in the first exemplary embodiment. Thus, the allowed error range of a gap alignment can be increased.

Like the first exemplary embodiment, the case where a gap is set at a position of a first Fourier image is discussed. Hereinafter, the image characteristic of the first Fourier image is referred to as a "1st.Peak characteristic." Here, P=40 μm, λ=0.65 μm, and n=1, and therefore, the gap position $z_1 \cong 4923$ μm.

Figure 15A:
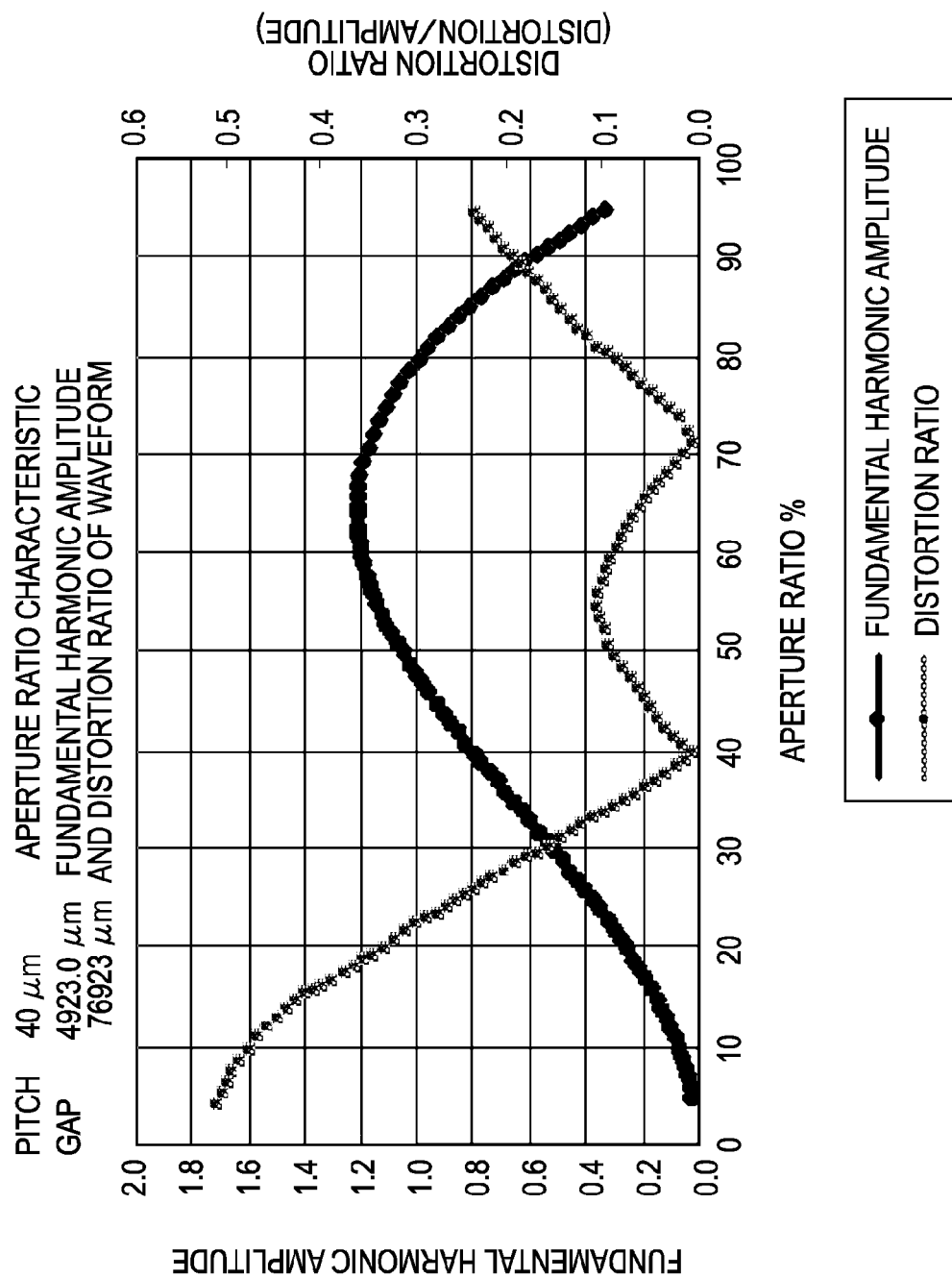
FIGS. 15A and 15B are graphs illustrating an application 4 of the second exemplary embodiment.
Figure 15B:
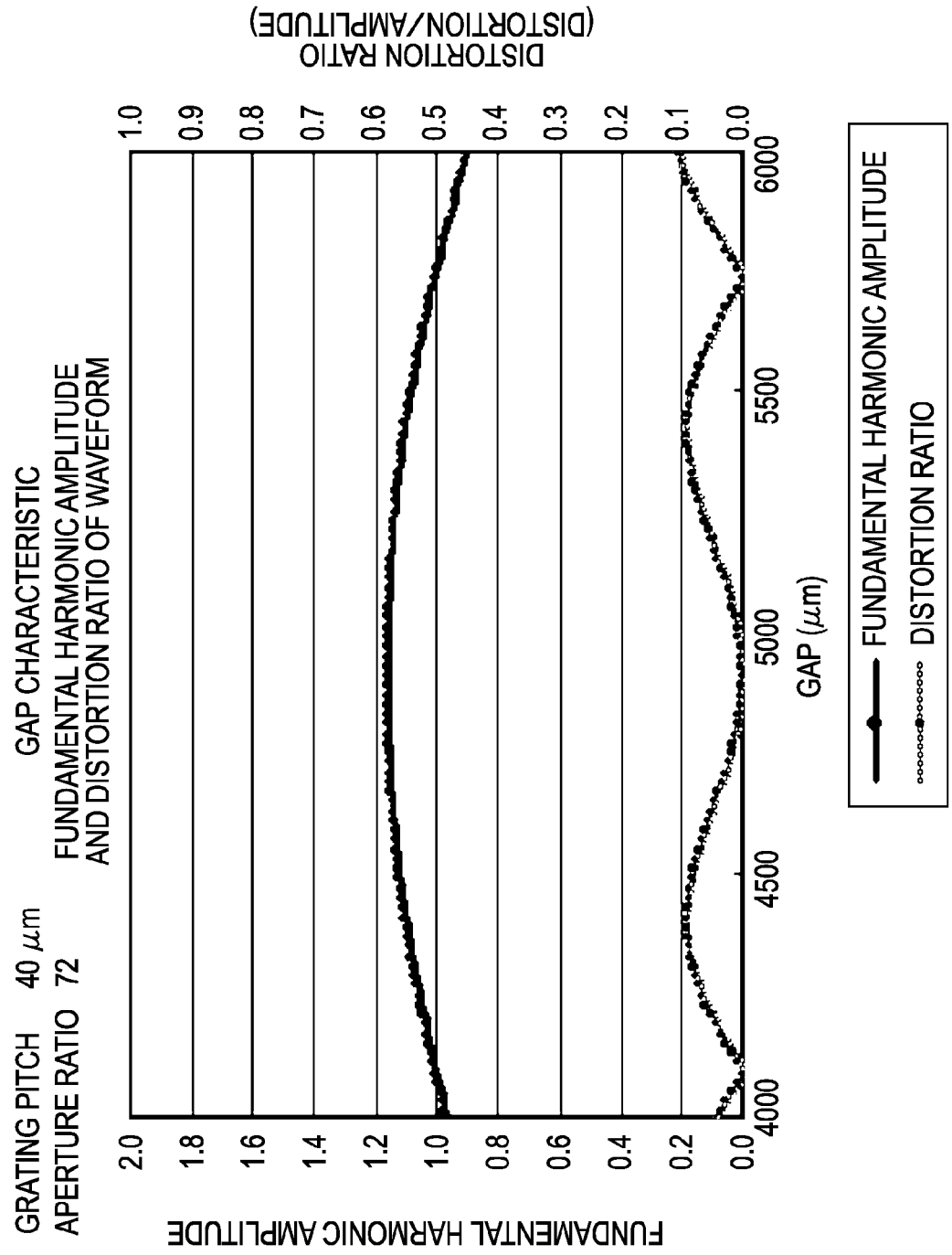

FIGS. 15A and 15B illustrate the aperture ratio characteristic curve and the gap characteristic curve according to this application, respectively.

According to the distortion evaluation equation of divergent light of at least one exemplary embodiment of the present invention (equation (39)), the minimal values appear at positions at which the optical effective aperture ratio AR=40.55% and 72.2%. These values are equal to those in the parallel beam illumination system. The amplitude of the fundamental harmonic when the aperture ratio is 72.2% is larger than that when the aperture ratio is 40.55%. Therefore, it is useful that the aperture ratio of 72.2% is selected, as in the first exemplary embodiment.

AS can be seen from the gap characteristic curve in FIG. 15B, the 3rd harmonic distortion is sufficiently eliminated or reduced at the set gap position of 4923 μm.

Like the first exemplary embodiment, the same feature can be provided at the gap point at which the Fourier image is formed in this divergent light illumination system, regardless of the pitch value.

Third Exemplary Embodiment

In the above-described exemplary embodiments, the grating is formed on a plane. In a third exemplary embodiment, the grating is disposed on a curved surface.

Figure 16A:
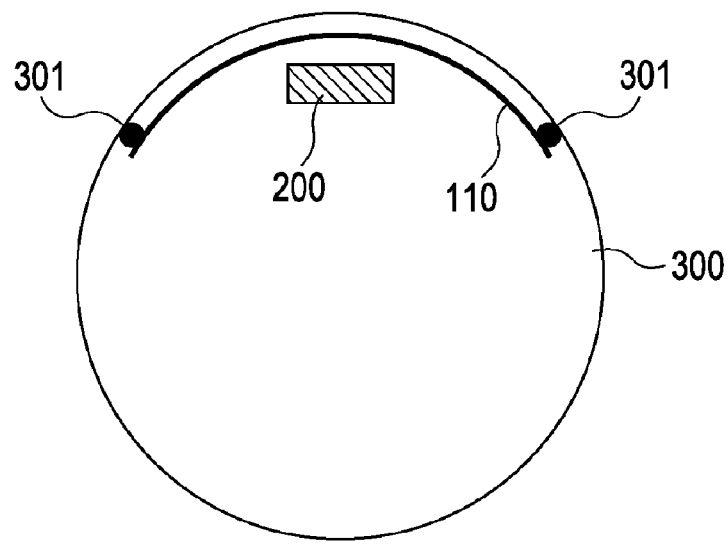
FIGS. 16A-C illustrate the structure of an optical encoder attached to a cylinder according to a third exemplary embodiment of the present invention.
Figure 16B:
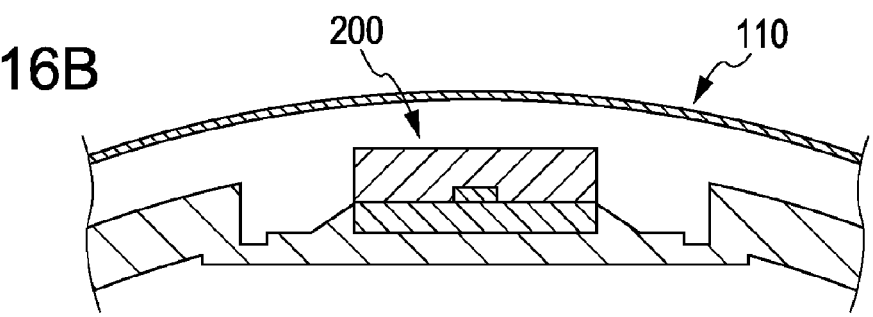
Figure 16C:
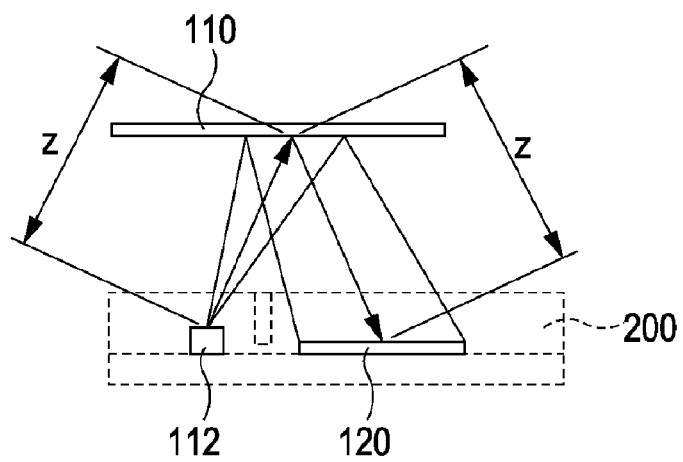
Figure 17A:
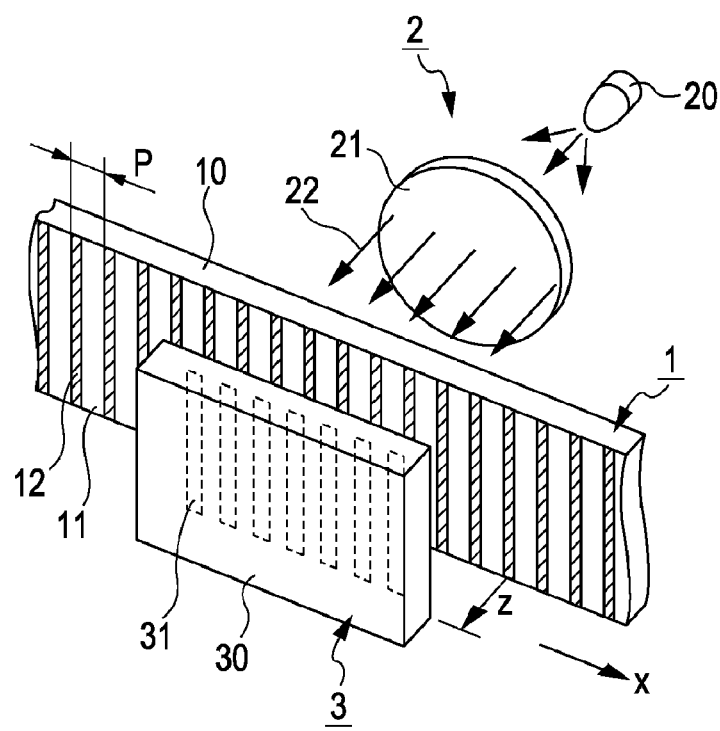
FIGS. 17A and 17B illustrate a known optical encoder.
Figure 17B:
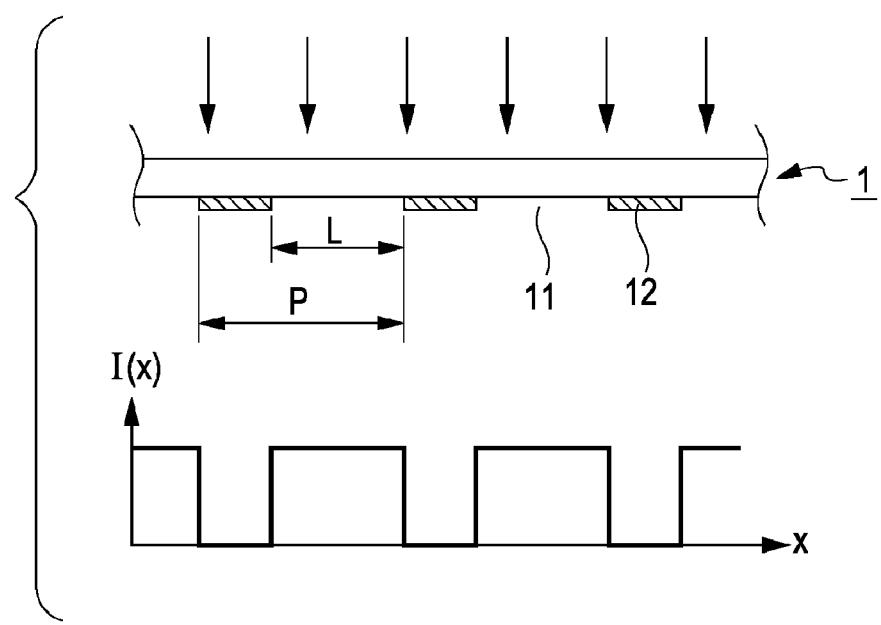

FIGS. 16A-C illustrate the structure of an optical encoder incorporated in an interchangeable lens of a single-lens reflex camera.

As shown in FIG. 16A, a main scale 110 is bonded to portions 301 of the inner surface of a cam ring 300 using a two sided adhesive tape. The cam ring 300 can be used for moving an auto-focus lens.

This example of an optical encoder is a rotary encoder in which the rotation angle of the cam ring 300, which is an object to be measured, is measured by use of a detection head 200.

FIG. 16B is an enlarged view of the main portion of the optical encoder. FIG. 16C illustrates the structure of the detection head 200. The detection head 200 includes a light source 112 and a light-receiving-element array 120 that optically operates in the same manner as an index scale. Here, Z denotes an effective gap size.

When a main scale 110 having a curved surface is used, divergent light beams emitted from the light source 112 are subjected to a wave plane transformation on a surface of the main scale 110. Therefore, it is not easy to accurately obtain the diffraction intensity of a diffraction grating.

However, by overlapping the diffraction waves while taking into account a change in the curvature of the wave plane received by the curved reflecting surface of the grating, the diffraction intensity can be computed even for such a structure.

In the optical calculation model for a reflective encoder shown in FIG. 14, the change in the curvature of the wave plane received by the curved grating can be computed by changing the coordinates of the virtual light sources $L_{+1}$, $L_{-1}$, ... so that these coordinates correspond to the curvature of the wave plane received by the curved grating. Thus, the intensity distribution of the diffraction image can be computed.

By using the obtained intensity distribution equation of the interference image, the aperture ratio of the main scale 110 can be determined so that the 3rd harmonic component is minimized.

As described above with reference to the first to third exemplary embodiments, at least one exemplary embodiment of the present invention is applicable to either scale of a transmissive type and a reflective type. In addition, at least one exemplary embodiment of the present invention is not limited to a linear type grating described in the foregoing exemplary embodiments. For example, at least one exemplary embodiment of the present invention is applicable to a rotary type grating that extends radially.

Furthermore, at least one exemplary embodiment of the present invention is applicable to a cylinder scale disposed on a curved surface of a cylinder by taking into account the effect of the curved surface.

The light beams emitted to the main scale are not limited to a parallel light beam. At least one exemplary embodiment of the present invention is applicable to an optical encoder that emits a divergent light beam to the main scale and can provide the same features.

Still furthermore, in the foregoing exemplary embodiments, the elimination or reduction of the 3rd harmonic component has been described. However, in this method, the eliminated or reduced component is not limited to the 3rd harmonic component. For example, is applicable to another harmonic component. In addition, this method is applicable to a plurality of harmonic components.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-247664 filed Aug. 29, 2005, which is hereby incorporated by reference herein in its entirety.

What is claimed is:

1. An optical encoder comprising:
    a scale including a first diffraction grating, the scale configured to move relative to a light source, the first diffraction grating configured to diffract a portion of a light beam emitted from the light source;
    a light receiving unit including a plurality of light-receiving elements, the light receiving unit configured to receive interference fringes formed by the overlap of diffracted light beams diffracted by the first diffraction grating and configured to generate an output signal;
    the light receiving unit disposed between the first diffraction grating and the light receiving unit; and
    a computing unit configured to compute an amount of movement of the scale relative to the light source on the basis of the output signal;
    wherein, when λ denotes the wavelength of the light source, P denotes the pitch of the first diffraction grating, x denotes a direction of the grating arrangement, AR (=d/P) denotes the optical effective aperture ratio of the first diffraction grating, d denotes the optical effective aperture width of the first diffraction grating, GAP (=z) denotes an effective optical gap between the first diffraction grating and the light receiving unit, and PO denotes a period of a fundamental harmonic of interference fringes overlapped on the second diffraction grating, AR and GAP are determined so that the following evaluation equation D including a relational expression $I(x, z, d, P, \lambda)$ has a minimal value:

$$D = \int_0^p \{I(x, z, d, p, \lambda) - I(x - po/2, z, d, p, \lambda)\} dx$$

where 
$$I(x, z, d, P, \lambda) = \frac{2d\cos\left[\frac{2\pi x}{p} + \frac{2\pi z}{\lambda} - \frac{2\pi z\sqrt{1-\frac{\lambda^2}{p^2}}}{\lambda}\right]\sin\left[\frac{d\pi}{p}\right]}{p\pi} +$$

$$\frac{2d\cos\left[\frac{2\pi x}{p} - \frac{2\pi z}{\lambda} + \frac{2\pi z\sqrt{1-\frac{\lambda^2}{p^2}}}{\lambda}\right]\sin\left[\frac{d\pi}{p}\right]}{p\pi} +$$

$$\frac{\cos\left[\frac{6\pi x}{p} + \frac{2\pi z\sqrt{1-\frac{4\lambda^2}{p^2}}}{\lambda} - \frac{2\pi z\sqrt{1-\frac{\lambda^2}{p^2}}}{\lambda}\right]\sin\left[\frac{d\pi}{p}\right]\sin\left[\frac{2d\pi}{p}\right]}{\pi^2} +$$

$$\frac{\cos\left[\frac{6\pi x}{p} - \frac{2\pi z\sqrt{1-\frac{4\lambda^2}{p^2}}}{\lambda} + \frac{2\pi z\sqrt{1-\frac{\lambda^2}{p^2}}}{\lambda}\right]\sin\left[\frac{d\pi}{p}\right]\sin\left[\frac{2d\pi}{p}\right]}{\pi^2} +$$

$$\frac{2d\cos\left[\frac{6\pi x}{p} + \frac{2\pi z}{\lambda} - \frac{2\pi z\sqrt{1-\frac{9\lambda^2}{p^2}}}{\lambda}\right]\sin\left[\frac{3d\pi}{p}\right]}{3p\pi} +$$

$$\frac{2d\cos\left[\frac{6\pi x}{p} - \frac{2\pi z}{\lambda} + \frac{2\pi z\sqrt{1-\frac{9\lambda^2}{p^2}}}{\lambda}\right]\sin\left[\frac{3d\pi}{p}\right]}{3p\pi}$$

when the first diffraction grating is illuminated with the portion of the light beam which is a substantially parallel light beam portion, and $$I(x, z, d, p, \lambda) =$$

$$\frac{2d\cos\left[\frac{2\pi\sqrt{x^2+4z^2}}{\lambda} - \frac{2\pi\sqrt{\left(x-\frac{z\lambda}{p}\right)^2 + z^2\left(1+\sqrt{1-\frac{\lambda^2}{p^2}}\right)^2}}{\lambda}\right]\sin\left[\frac{d\pi}{p}\right]}{p\pi} +$$

$$\frac{2d\cos\left[\frac{2\pi\sqrt{x^2+4z^2}}{\lambda} - \frac{2\pi\sqrt{\left(x-\frac{z\lambda}{p}\right)^2 + z^2\left(1+\sqrt{1-\frac{\lambda^2}{p^2}}\right)^2}}{\lambda}\right]\sin\left[\frac{d\pi}{p}\right]}{p\pi} +$$

$$\frac{1}{\pi^2}\left(\cos\left[\frac{2\pi\sqrt{\left(x+\frac{2z\lambda}{p}\right)^2 + z^2\left(1+\sqrt{1-\frac{4\lambda^2}{p^2}}\right)^2}}{\lambda} - \right.$$

$$\left.\frac{2\pi\sqrt{\left(x+\frac{z\lambda}{p}\right)^2 + z^2\left(1+\sqrt{1-\frac{\lambda^2}{p^2}}\right)^2}}{\lambda}\right]\sin\left[\frac{d\pi}{p}\right]\sin\left[\frac{2d\pi}{p}\right]\right) +$$

$$\frac{1}{\pi^2}\left(\cos\left[\frac{2\pi\sqrt{\left(x+\frac{2z\lambda}{p}\right)^2 + z^2\left(1+\sqrt{1-\frac{4\lambda^2}{p^2}}\right)^2}}{\lambda} - \right.$$

$$\left.\frac{2\pi\sqrt{\left(x+\frac{z\lambda}{p}\right)^2 + z^2\left(1+\sqrt{1-\frac{\lambda^2}{p^2}}\right)^2}}{\lambda}\right]\sin\left[\frac{d\pi}{p}\right]\sin\left[\frac{2d\pi}{p}\right]\right) +$$

$$\frac{1}{3p\pi}\left(2d\cos\left[\frac{2\pi\sqrt{x^2+4z^2}}{\lambda} - \frac{2\pi\sqrt{\left(x+\frac{3z\lambda}{p}\right)^2 + z^2\left(1+\sqrt{1-\frac{4\lambda^2}{p^2}}\right)^2}}{\lambda}\right]\sin\left[\frac{3d\pi}{p}\right]\right) +$$

$$\frac{1}{3p\pi}\left(2d\cos\left[\frac{2\pi\sqrt{x^2+4z^2}}{\lambda} - \frac{2\pi\sqrt{\left(x+\frac{3z\lambda}{p}\right)^2 + z^2\left(1+\sqrt{1-\frac{9\lambda^2}{p^2}}\right)^2}}{\lambda}\right]\sin\left[\frac{3d\pi}{p}\right]\right)$$

when the first diffraction grating is illuminated with the portion of the light beam which is a substantially divergent light beam portion.

2. The optical encoder according to claim 1, wherein $GAP = z = Z_n \pm 0.1 \times Z_1$
where $\lambda$ denotes the wavelength of the light source, P denotes the pitch of the first diffraction grating, GAP (=z) denotes an effective optical gap between the first diffraction grating and the light receiving unit, and PO denotes a period of a fundamental harmonic of interference fringes overlapped on the light receiving unit, and $Z_n = (PO/P)nP^2/\lambda (n=1, 2, 3, \ldots)$.

3. The optical encoder according to claim 1, wherein the first diffraction grating is curved.

* * * * *